(12) United States Patent
Hagner et al.

(10) Patent No.: US 9,970,348 B2
(45) Date of Patent: May 15, 2018

(54) SYSTEM AND METHODS FOR ADJUSTING AN EXHAUST GAS RECIRCULATION VALVE BASED ON MULTIPLE SENSOR OUTPUTS

(71) Applicant: Ford Global Technologies, LLC, Dearborn, MI (US)

(72) Inventors: David G. Hagner, Beverly Hills, MI (US); Gopichandra Surnilla, West Bloomfield, MI (US); James Alfred Hilditch, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 643 days.

(21) Appl. No.: 14/616,354

(22) Filed: Feb. 6, 2015

(65) Prior Publication Data
US 2016/0230682 A1 Aug. 11, 2016

(51) Int. Cl.
| | | |
|---|---|---|
| F02D 41/00 | (2006.01) | |
| F02B 37/00 | (2006.01) | |
| F02D 41/14 | (2006.01) | |
| F02D 41/26 | (2006.01) | |
| F02M 26/04 | (2016.01) | |

(Continued)

(52) U.S. Cl.
CPC .......... *F02B 37/00* (2013.01); *F02D 41/0072* (2013.01); *F02D 41/144* (2013.01); *F02D 41/26* (2013.01); *F02D 41/003* (2013.01); *F02D 41/005* (2013.01); *F02D 41/0007* (2013.01); *F02D 41/1454* (2013.01); *F02D 2041/1431* (2013.01); *F02D 2200/0418* (2013.01); *F02M 25/06* (2013.01); *F02M 25/08* (2013.01); *F02M 26/04* (2016.02); *F02M 26/47* (2016.02); *F02M 26/48* (2016.02); *F02M 26/49* (2016.02); *F02M 26/51* (2016.02); *Y02T 10/47* (2013.01)

(58) Field of Classification Search
CPC .. F02D 41/005; F02D 41/144; F02D 41/0007; F02D 41/0072; F02D 41/1454
See application file for complete search history.

(56) References Cited

U.S. PATENT DOCUMENTS

| | | |
|---|---|---|
| 6,446,498 B1 | 9/2002 | Schricker et al. |
| 6,742,379 B2 | 6/2004 | Matsubara et al. |

(Continued)

OTHER PUBLICATIONS

Hakeem, M. et al., "Methods and Systems for Determining a Fuel Concentration in Engine Oil Using an Intake Oxygen Sensor," U.S. Appl. No. 14/252,679, filed Apr. 14, 2014, 63 pages.

(Continued)

*Primary Examiner* — Hieu T Vo
*Assistant Examiner* — Arnold Castro
(74) *Attorney, Agent, or Firm* — Julia Voutyras; McCoy Russell LLP

(57) ABSTRACT

Methods and systems are provided for adjusting an exhaust gas recirculation (EGR) valve based on a final EGR estimate. In one example, a method may include adjusting the EGR valve based on a final EGR flow estimate, the final EGR flow estimate based on a first EGR flow estimated with a differential pressure sensor across the EGR valve, a second EGR flow estimated with an intake oxygen sensor, and accuracy values of each of the first and second EGR flows. The accuracy value may be based on engine operating conditions during estimation of the first and second EGR flows.

19 Claims, 6 Drawing Sheets

(51) Int. Cl.
| | |
|---|---|
| F02M 26/51 | (2016.01) |
| F02M 25/06 | (2016.01) |
| F02M 25/08 | (2006.01) |
| F02M 26/49 | (2016.01) |
| F02M 26/47 | (2016.01) |
| F02M 26/48 | (2016.01) |

(56) References Cited

U.S. PATENT DOCUMENTS

| | | | |
|---|---|---|---|
| 6,755,078 B2 | 6/2004 | Hernandez et al. | |
| 8,042,528 B2 | 10/2011 | Gates et al. | |
| 2009/0000367 A1* | 1/2009 | Ohata | F02D 41/0072 73/114.74 |
| 2009/0133385 A1* | 5/2009 | Ono | F01N 9/002 60/277 |
| 2011/0184632 A1 | 7/2011 | Kang et al. | |
| 2011/0219746 A1* | 9/2011 | Yezerets | F01N 3/035 60/274 |
| 2012/0037134 A1* | 2/2012 | Jankovic | F02D 41/0002 123/568.21 |
| 2012/0225752 A1* | 9/2012 | Gonze | F01N 3/2026 477/100 |
| 2012/0297767 A1* | 11/2012 | Hofbauer | F02B 37/10 60/605.2 |
| 2013/0061831 A1 | 3/2013 | Gambhir et al. | |
| 2013/0073179 A1 | 3/2013 | Song et al. | |
| 2013/0228228 A1 | 9/2013 | Akahane et al. | |
| 2014/0251285 A1 | 9/2014 | Surnilla et al. | |
| 2015/0033735 A1* | 2/2015 | Makki | F02D 41/0072 60/605.2 |
| 2015/0047339 A1* | 2/2015 | Rollinger | F02B 29/0468 60/599 |
| 2015/0047603 A1* | 2/2015 | Surnilla | F02D 41/0007 123/350 |
| 2015/0053186 A1 | 2/2015 | Surnilla et al. | |
| 2015/0075502 A1 | 3/2015 | Surnilla et al. | |
| 2015/0075503 A1 | 3/2015 | Surnilla et al. | |
| 2015/0101564 A1 | 4/2015 | Surnilla et al. | |
| 2015/0113948 A1 | 4/2015 | Surnilla et al. | |
| 2015/0114346 A1* | 4/2015 | Surnilla | F02D 41/0007 123/349 |
| 2015/0128916 A1 | 5/2015 | Surnilla et al. | |
| 2015/0239464 A1* | 8/2015 | Ando | B60K 6/445 701/22 |
| 2015/0240730 A1* | 8/2015 | Styles | F02D 41/144 123/393 |
| 2015/0292424 A1* | 10/2015 | Surnilla | F02D 41/005 60/605.2 |
| 2015/0292429 A1* | 10/2015 | Surnilla | F02D 41/144 701/108 |
| 2016/0160775 A1* | 6/2016 | Endo | F02P 5/1504 123/2 |
| 2016/0177847 A1* | 6/2016 | Surnilla | F02M 35/10373 701/108 |
| 2016/0208725 A1* | 7/2016 | Fukuda | F02D 41/20 |
| 2016/0229390 A1* | 8/2016 | Takahashi | B60W 10/06 |

OTHER PUBLICATIONS

Surnilla, G. et al., "Methods and Systems for Adjusting EGR Based on an Impact of PCV Hyrdrocarbons on an Intake Oxygen Sensor," U.S. Appl. No. 14/252,693, filed Apr. 14, 2014, 63 pages.

Styles, D. et al., "Method for Estimating Charge Air Cooler Condensation Storage with an Intake Oxygen Sensor while Exhaust Gas Recirculation Is Flowing," U.S. Appl. No. 14/192,765, filed Feb. 27, 2015, 49 pages.

Surnilla, G. et al., "System and Methods for Diagnosing Soot Accumulation on an Exhaust Gas Recirculation Valve," U.S. Appl. No. 14/616,452, filed Feb. 6, 2015, 66 pages.

Surnilla, G. et al., "System and Methods for Operating an Exhaust Gas Recirculation Valve Based on a Temperature Difference of the Valve," U.S. Appl. No. 14/616,496, filed Feb. 6, 2015, 67 pages.

* cited by examiner

| DP Accuracy \ Oxygen Sensor Accuracy | 3 | 2 | 1 | 0 |
|---|---|---|---|---|
| 3 | Use oxygen sensor estimate or if water droplets possible restrict oxygen sensor estimate to within DP tolerance interval  502 | Use oxygen sensor estimate, but restrict it to within DP tolerance interval  506 | Use DP estimate, or restrict oxygen sensor estimate to within DP tolerance interval  510 | Do not make EGR estimate  514 |
| 2 | Use oxygen sensor estimate or if water droplets possible restrict oxygen sensor estimate to within DP tolerance interval  503 | Use oxygen sensor estimate, but restrict it to within DP tolerance interval  507 | Use oxygen sensor estimate, but restrict it to within DP tolerance interval  511 | Do not make EGR estimate  515 |
| 1 | Use oxygen sensor estimate or if water droplets possible restrict oxygen sensor estimate to within DP tolerance interval  504 | Use oxygen sensor estimate, but restrict it to within DP tolerance interval  508 | Use oxygen sensor estimate, but restrict it to within DP tolerance interval  512 | Do not make EGR estimate  516 |
| 0 | Do not make EGR estimate  505 | Do not make EGR estimate  509 | Do not make EGR estimate  513 | Do not make EGR estimate  517 |

FIG. 5

SYSTEM AND METHODS FOR ADJUSTING AN EXHAUST GAS RECIRCULATION VALVE BASED ON MULTIPLE SENSOR OUTPUTS

FIELD

The present description relates generally to methods and systems for an exhaust gas recirculation system of an internal combustion engine.

BACKGROUND/SUMMARY

Engine systems may utilize recirculation of exhaust gas from an engine exhaust system to an engine intake system (intake passage), a process referred to as exhaust gas recirculation (EGR), to reduce regulated emissions and improve fuel economy. An EGR system, such as a low-pressure EGR system, may include various sensors to measure and/or control the EGR. As one example, an engine intake system may include an intake gas constituent sensor, such as an oxygen sensor, which may be employed during non-EGR conditions to determine the oxygen content of fresh intake air. During EGR conditions, the sensor may be used to infer EGR based on a change in oxygen concentration due to addition of EGR as a diluent. One example of such an intake oxygen sensor is shown by Matsubara et al. in U.S. Pat. No. 6,742,379. However, the accuracy of EGR estimates using the intake oxygen sensor may be reduced during certain engine operating conditions (e.g., when the engine is boosted or when purge is enabled and hydrocarbons are flowing through the intake system). EGR flow may also be estimated using alternate EGR sensors. For example, the EGR system may also include differential pressure (DP) sensor positioned around an EGR valve for estimating EGR flow based on a pressure difference across the EGR valve and a flow area of the EGR valve. EGR flow estimates may then be used to adjust a position of the EGR valve and therefore adjust an amount of EGR provided to the engine. Thus, both the IAO2 sensor and the DP sensor may be used to give independent estimates of the EGR flow. However, the inventors herein have recognized that the accuracies of each of the IAO2 and DP sensors may change depending on the engine operating conditions, thereby altering the accuracy of the resulting EGR flow estimates. Thus, under certain engine operating conditions the DP sensor may be more accurate than the IAO2 sensor and vice versa. As one example, the DP sensor may be more accurate than the IAO2 sensor when purge and/or PCV gasses are flowing through the intake system.

In one example, the issues described above may be addressed by a method for adjusting engine operation based on a final gas flow parameter estimate, the final gas flow parameter estimate based on each of a first gas flow parameter estimated with a first sensor, a second gas flow parameter estimated with a second sensor positioned away from the first sensor in a gas passage of the engine, and accuracy values of each of the first and second gas flow parameters. In this way, the final gas flow parameter estimate may have an increased accuracy, thereby improving engine control.

As one example, the final gas flow parameter estimate may be a final exhaust gas recirculation (EGR) flow estimate. For example, an engine may include an EGR passage routing EGR via an EGR valve from an exhaust passage to an intake passage of the engine. An engine controller may estimate a first EGR flow based on a pressure difference across the EGR valve and a flow area of the EGR valve. The engine controller may also estimate a second EGR flow based on an output of an intake oxygen sensor positioned in the intake passage, downstream from the EGR passage. Additionally, the engine controller may assign a first accuracy value to the first EGR flow estimate and a second accuracy value to the second EGR flow estimate based on engine operating conditions during the estimation. For example, the first accuracy value may be based on one or more of compressor surge, a position of a compressor bypass valve, and a differential pressure output by the differential pressure sensor and the second accuracy value may be based on one or more of a status of the intake oxygen sensor, purge flow, and positive crankcase ventilation (PCV) flow. A final EGR flow estimate may then be determined based on the first EGR flow estimate, second EGR flow estimate, first accuracy value, and second accuracy value. For example, the final EGR flow estimate may be more heavily based on one or the first or second EGR flow estimate based on the first and second accuracy values relative to one another. In this way, a more accurate EGR flow estimate may be determined. The engine controller may then adjust the EGR valve in order to deliver the requested EGR flow based on the final EGR flow estimate.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 5 shows a block diagram for determining how to use outputs of an oxygen sensor and differential pressure sensor to estimate an EGR proportion in intake air based on the accuracy of the sensors.

DETAILED DESCRIPTION

Figure 1:
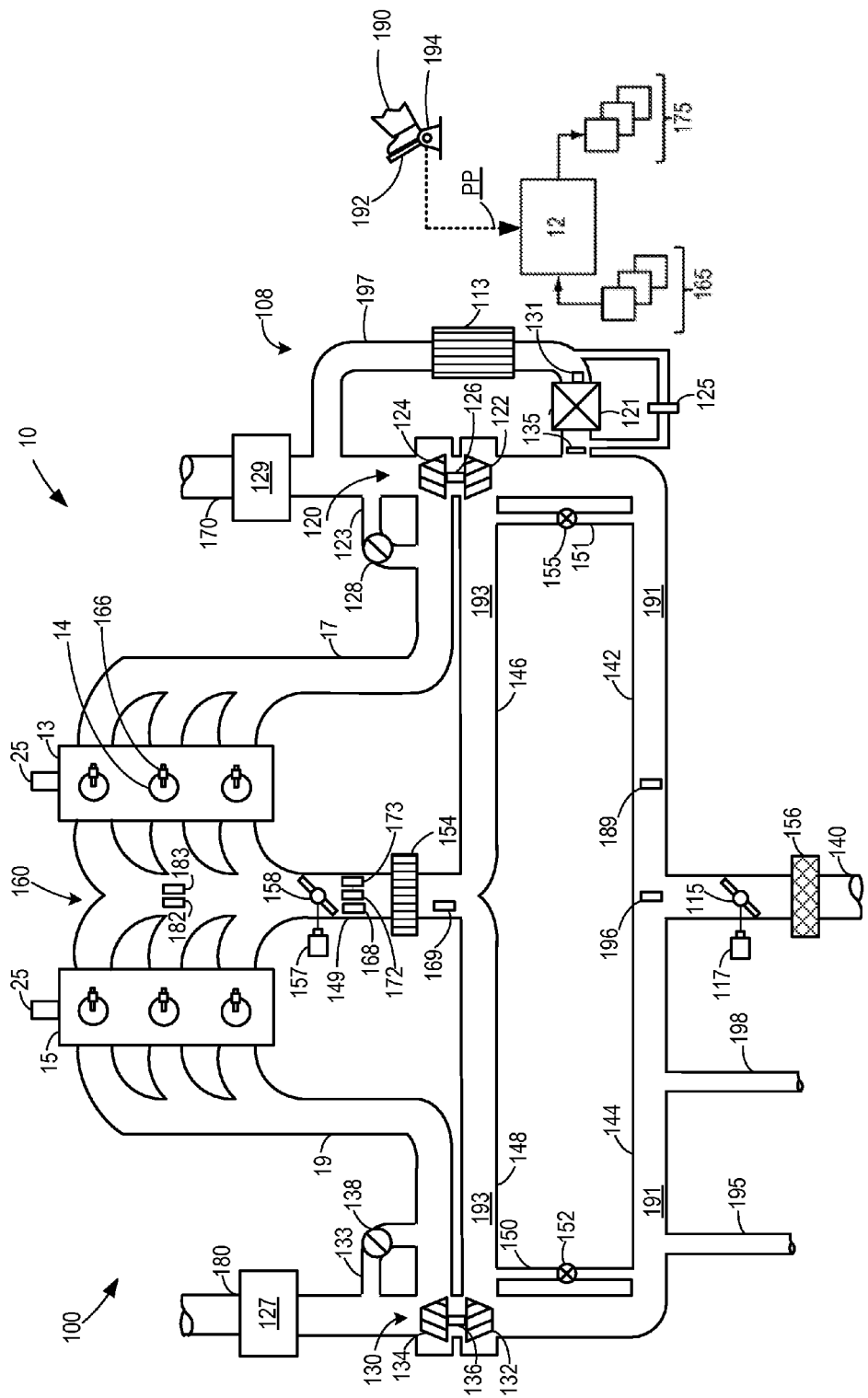
FIG. 1 is a schematic diagram of an example engine system including an intake oxygen sensor and exhaust gas recirculation system.

The following description relates to systems and methods for determining a gas flow parameter of a gas flow in a vehicle engine based on estimates of the gas flow parameter from outputs of two sensors positioned in separate locations of the engine system. As one example, the gas flow parameter may include a fraction of exhaust gas recirculation (EGR) in the intake system of a turbocharged engine. A turbocharged engine, as shown in FIG. 1, may include an intake oxygen sensor located in an intake passage of the engine and a differential pressure (DP) sensor located in an EGR passage. The DP sensor and intake oxygen sensor may each be used to give estimates of an EGR flow through a low pressure EGR system. The EGR flow may be regulated by an EGR valve that, when open, may allow exhaust gas to recirculate to an intake passage from downstream of a turbine to upstream of a compressor. However, the accuracy of the DP and oxygen sensors may change depending on engine operating conditions. As an example, the accuracy of the oxygen sensor may be lower than the DP sensor when purge and/or PCV gasses flow through the intake system. On the other hand, the DP sensor may be less accurate than the oxygen sensor when compressor surge is active, or a compressor bypass valve (CBV) is open. Thus, the accuracy of estimates of the EGR flow may be increased by a method for determining the accuracy of the sensors and incorporating measurements from both of the sensors into a final EGR flow estimate. Methods for determining the accuracy of the DP and oxygen sensor EGR estimates are presented at FIGS. 3 and 4.

Figure 2A:
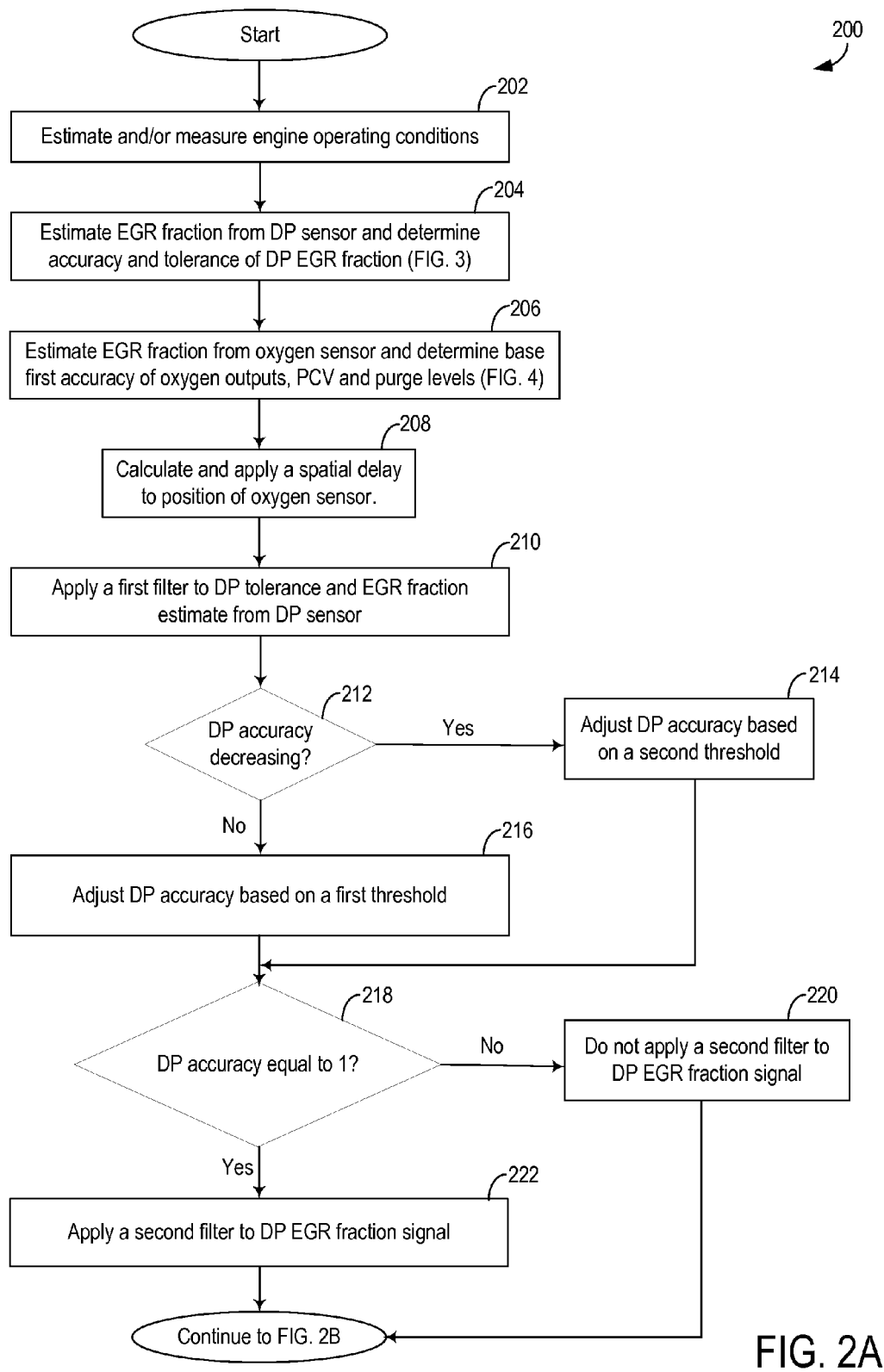
FIGS. 2A-2B are flow charts of a method for determining a gas flow parameter of gasses in an engine gas passage based on outputs of two sensors located in different positions of an engine.
Figure 2B:
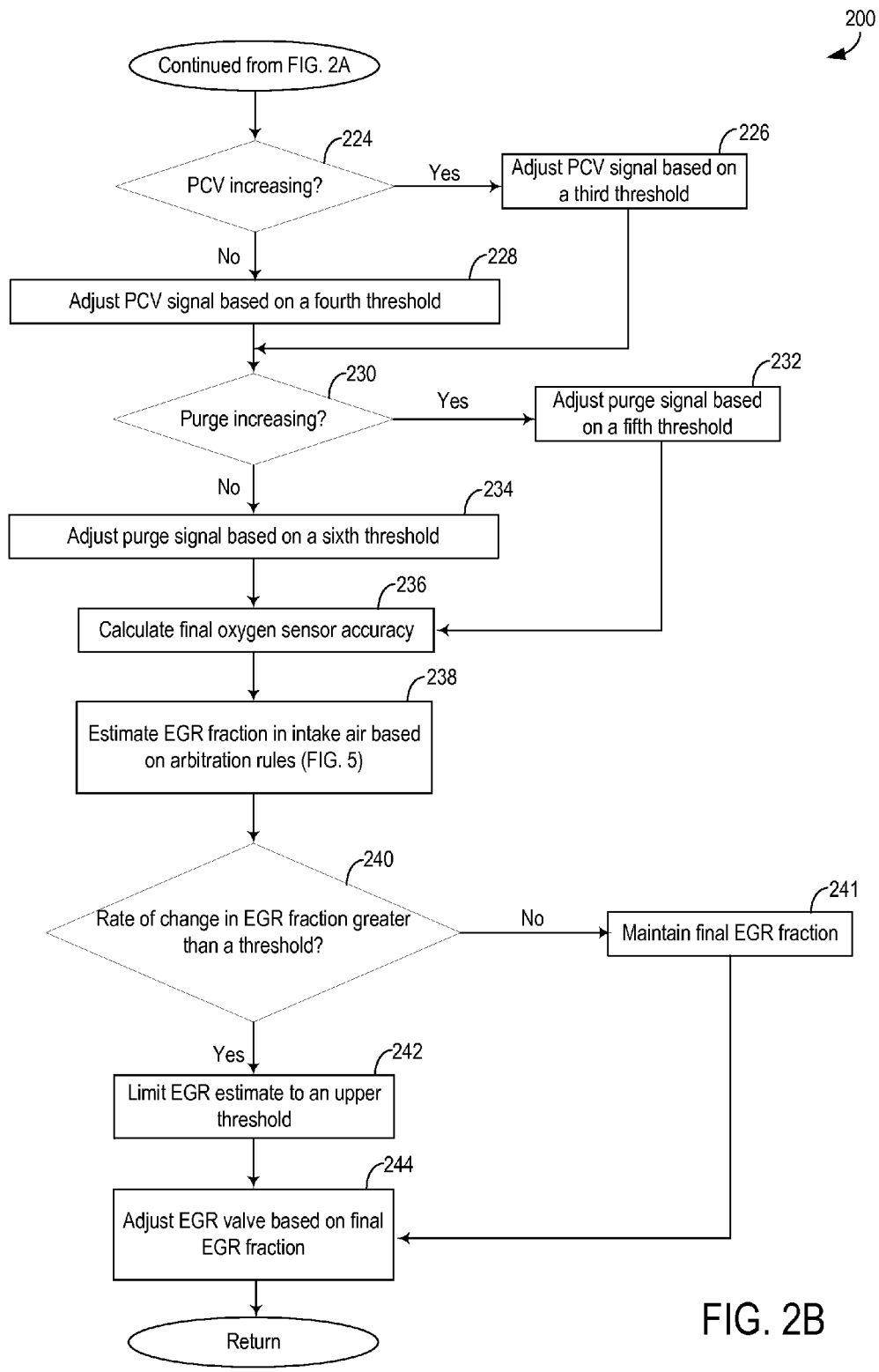
Figure 3:
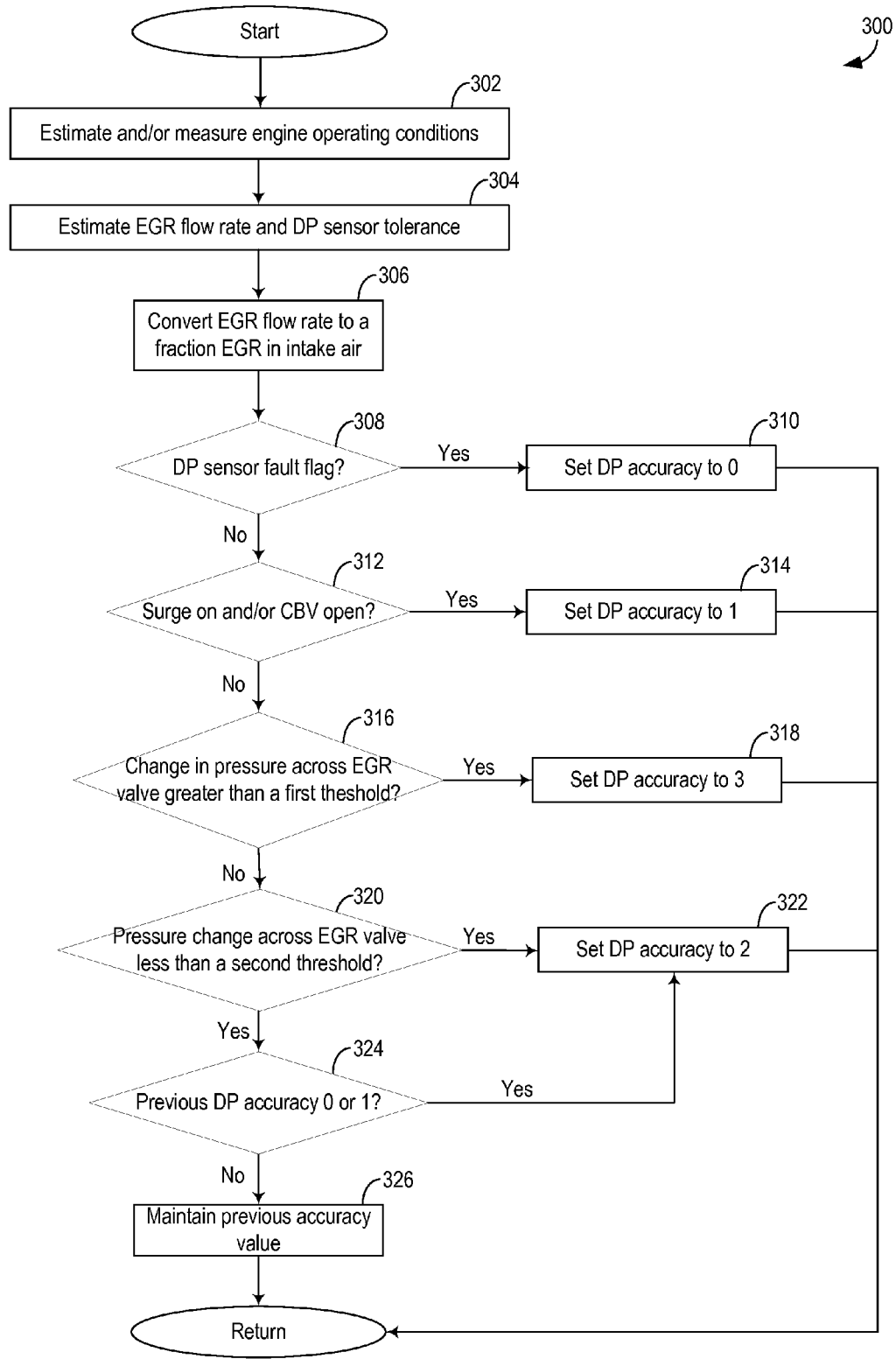
FIG. 3 is a flow chart of a method for determining the accuracy of outputs of a differential pressure sensor used for estimating an EGR proportion in intake air.
Figure 4:
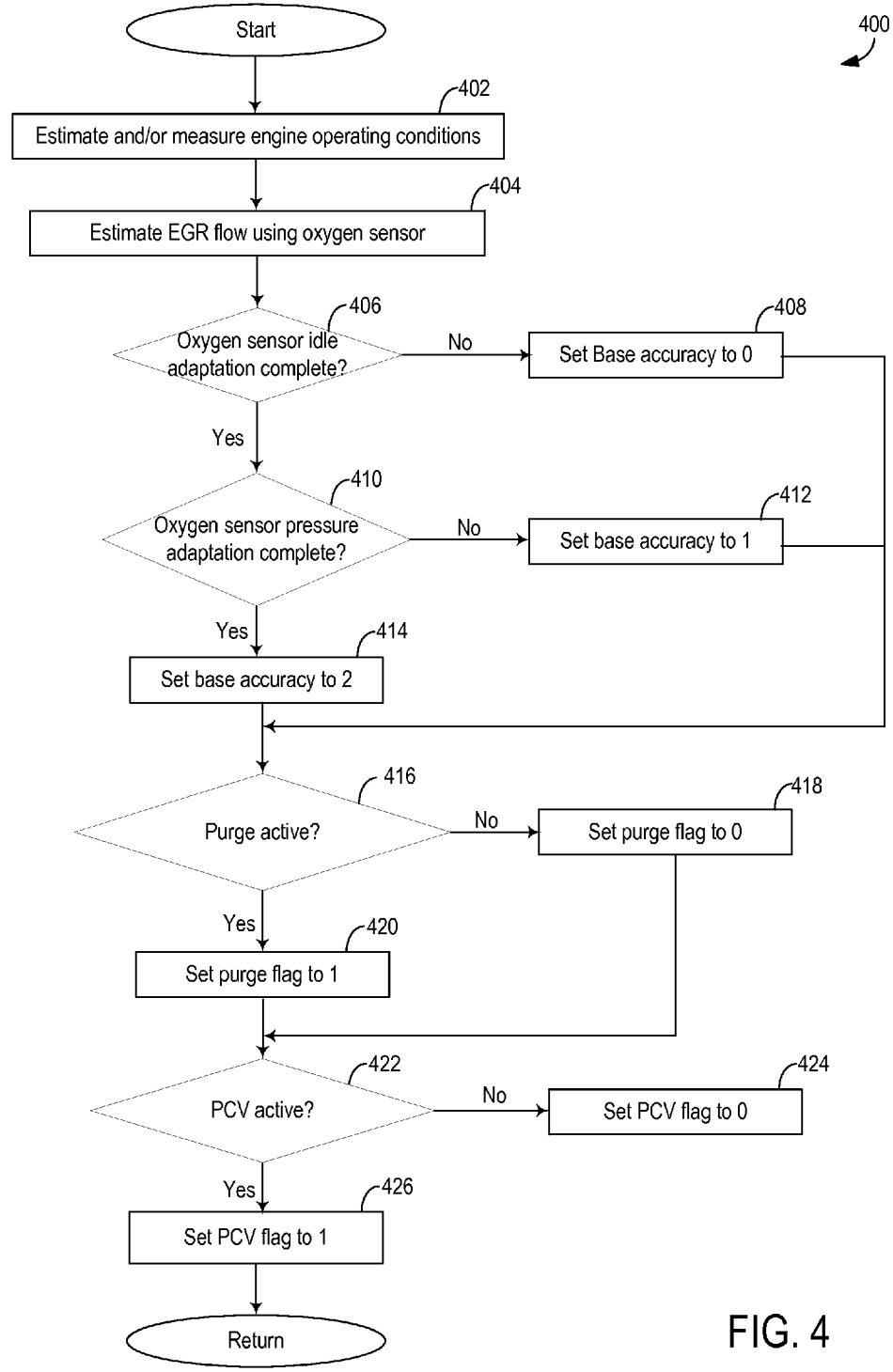
FIG. 4 is a flow chart of a method for determining the accuracy of outputs of an oxygen sensor used for estimating an EGR proportion in intake air.

As described in FIGS. 2-4, the accuracies of each of the sensors may be determined based on the engine operating conditions. Specifically, the accuracies of the sensors may be based on the presence of "push-side" Purge and/or PCV gasses in the intake system, pressure drop across the EGR valve, presence of compressor surge, a position of a CBV valve, etc. Based on the accuracies of each of the sensors, a final EGR flow estimate may be obtained, as described in FIG. 2. Further, a method for incorporating the oxygen and DP sensor outputs into an EGR flow estimate depending on changes in the accuracies of the sensors is described in FIG. 5. By considering outputs from both the oxygen and DP sensors, the accuracy of the EGR flow estimate may be increased under a wider range of engine operating conditions.

FIG. 1 shows a schematic depiction of an example turbocharged engine system 100 including a multi-cylinder internal combustion engine 10 and twin turbochargers 120 and 130, which may be identical. As one non-limiting example, engine system 100 can be included as part of a propulsion system for a passenger vehicle. While not depicted herein, other engine configurations such as an engine with a single turbocharger may be used without departing from the scope of this disclosure.

Engine system 100 may be controlled at least partially by a controller 12 and by input from a vehicle operator 190 via an input device 192. In this example, input device 192 includes an accelerator pedal and a pedal position sensor 194 for generating a proportional pedal position signal PP. Controller 12 may be a microcomputer including the following: a microprocessor unit, input/output ports, an electronic storage medium for executable programs and calibration values (e.g., a read only memory chip), random access memory, keep alive memory, and a data bus. The storage medium read-only memory may be programmed with computer readable data representing non-transitory instructions executable by the microprocessor for performing the routines described herein as well as other variants that are anticipated but not specifically listed. Controller 12 may be configured to receive information from a plurality of sensors 165 and to send control signals to a plurality of actuators 175 (various examples of which are described herein). Other actuators, such as a variety of additional valves and throttles, may be coupled to various locations in engine system 100. Controller 12 may receive input data from the various sensors, process the input data, and trigger the actuators in response to the processed input data based on instruction or code programmed therein corresponding to one or more routines. Example control routines are described herein with regard to FIGS. 2-4.

Engine system 100 may receive intake air via intake passage 140. As shown at FIG. 1, intake passage 140 may include an air filter 156 and an air induction system (AIS) throttle 115. The position of AIS throttle 115 may be adjusted by the control system via a throttle actuator 117 communicatively coupled to controller 12.

At least a portion of the intake air may be directed to a compressor 122 of turbocharger 120 via a first branch of the intake passage 140 as indicated at 142 and at least a portion of the intake air may be directed to a compressor 132 of turbocharger 130 via a second branch of the intake passage 140 as indicated at 144. Accordingly, engine system 100 includes a low-pressure AIS system (LP AIS) 191 upstream of compressors 122 and 132, and a high-pressure AIS system (HP AIS) 193 downstream of compressors 122 and 132.

A positive crankcase ventilation (PCV) conduit 198 (e.g., push-side pipe) may couple a crankcase (not shown) to the second branch 144 of the intake passage such that gases in the crankcase may be vented in a controlled manner from the crankcase. Further, evaporative emissions from a fuel vapor canister (not shown) may be vented into the intake passage through a fuel vapor purge conduit 195 coupling the fuel vapor canister to the second branch 144 of the intake passage.

The first portion of the total intake air can be compressed via compressor 122 where it may be supplied to intake manifold 160 via intake air passage 146. Thus, intake passages 142 and 146 form a first branch of the engine's air intake system. Similarly, a second portion of the total intake air can be compressed via compressor 132 where it may be supplied to intake manifold 160 via intake air passage 148. Thus, intake passages 144 and 148 form a second branch of the engine's air intake system. As shown at FIG. 1, intake air from intake passages 146 and 148 can be recombined via a common intake passage 149 before reaching intake manifold 160, where the intake air may be provided to the engine. In some examples, intake manifold 160 may include an intake manifold pressure sensor 182 for estimating a manifold pressure (MAP) and/or an intake manifold temperature sensor 183 for estimating a manifold air temperature (MCT), each communicating with controller 12. In the depicted example, intake passage 149 also includes a charge air cooler (CAC) 154 and a throttle 158. The position of throttle 158 may be adjusted by the control system via a throttle actuator 157 communicatively coupled to controller 12. As shown, throttle 158 may be arranged in intake passage 149 downstream of CAC 154, and may be configured to adjust the flow of an intake gas stream entering engine 10.

As shown at FIG. 1, a compressor bypass valve (CBV) 152 may be arranged in CBV passage 150 and a CBV 155 may be arranged in CBV passage 151. In one example, CBVs 152 and 155 may be electronic pneumatic CBVs (EPCBVs). CBVs 152 and 155 may be controlled to enable release of pressure in the intake system when the engine is boosted. An upstream end of CBV passage 150 may be coupled with intake passage 148 downstream of compressor 132, and a downstream end of CBV passage 150 may be coupled with intake passage 144 upstream of compressor 132. Similarly, an upstream end of a CBV passage 151 may be coupled with intake passage 146 downstream of compressor 122, and a downstream end of CBV passage 151 may be coupled with intake passage 142 upstream of compressor 122. Depending on a position of each CBV, air compressed by the corresponding compressor may be recirculated into the intake passage upstream of the compressor (e.g., intake passage 144 for compressor 132 and intake passage 142 for compressor 122). For example, CBV 152 may open to recirculate compressed air upstream of compressor 132 and/or CBV 155 may open to recirculate compressed air upstream of compressor 122 to release pressure in the intake system during selected conditions to reduce the effects of compressor surge loading. CBVs 155 and 152 may be either actively or passively controlled by the control system.

As shown, a compressor inlet pressure (CIP) sensor 196 is arranged in the intake passage 142 and a HP AIS pressure sensor 169 is arranged in intake passage 149. However, in other anticipated embodiments, sensors 196 and 169 may be arranged at other locations within the LP AIS and HP AIS, respectively. Among other functions, CIP sensor 196 may be used to determine a pressure downstream of an EGR valve 121.

Engine 10 may include a plurality of cylinders 14. In the depicted example, engine 10 includes six cylinders arrange in a V-configuration. Specifically, the six cylinders are arranged on two banks 13 and 15, with each bank including three cylinders. In alternate examples, engine 10 can include two or more cylinders such as 3, 4, 5, 8, 10 or more cylinders. These various cylinders can be equally divided and arranged in alternate configurations, such as V, in-line, boxed, etc. Each cylinder 14 may be configured with a fuel injector 166. In the depicted example, fuel injector 166 is a direct in-cylinder injector. However, in other examples, fuel injector 166 can be configured as a port based fuel injector.

Intake air supplied to each cylinder 14 (herein, also referred to as combustion chamber 14) via common intake passage 149 may be used for fuel combustion and products of combustion may then be exhausted via bank-specific exhaust passages. In the depicted example, a first bank 13 of cylinders of engine 10 can exhaust products of combustion via a common exhaust passage 17 and a second bank 15 of cylinders can exhaust products of combustion via a common exhaust passage 19.

The position of intake and exhaust valves of each cylinder 14 may be regulated via hydraulically actuated lifters coupled to valve pushrods, or via mechanical buckets in which cam lobes are used. In this example, at least the intake valves of each cylinder 14 may be controlled by cam actuation using a cam actuation system. Specifically, the intake valve cam actuation system 25 may include one or more cams and may utilize variable cam timing or lift for intake and/or exhaust valves. In alternative embodiments, the intake valves may be controlled by electric valve actuation. Similarly, the exhaust valves may be controlled by cam actuation systems or electric valve actuation. In still another alternative embodiment, the cams may not be adjustable.

Products of combustion that are exhausted by engine 10 via exhaust passage 17 can be directed through exhaust turbine 124 of turbocharger 120, which in turn can provide mechanical work to compressor 122 via shaft 126 in order to provide compression to the intake air. Alternatively, some or all of the exhaust gases flowing through exhaust passage 17 can bypass turbine 124 via turbine bypass passage 123 as controlled by wastegate 128. The position of wastegate 128 may be controlled by an actuator (not shown) as directed by controller 12. As one non-limiting example, controller 12 can adjust the position of the wastegate 128 via pneumatic actuator controlled by a solenoid valve. For example, the solenoid valve may receive a signal for facilitating the actuation of wastegate 128 via the pneumatic actuator based on the difference in air pressures between intake passage 142 arranged upstream of compressor 122 and intake passage 149 arranged downstream of compressor 122. In other examples, other suitable approaches other than a solenoid valve may be used for actuating wastegate 128.

Similarly, products of combustion that are exhausted by engine 10 via exhaust passage 19 can be directed through exhaust turbine 134 of turbocharger 130, which in turn can provide mechanical work to compressor 132 via shaft 136 in order to provide compression to intake air flowing through the second branch of the engine's intake system. Alternatively, some or all of the exhaust gases flowing through exhaust passage 19 can bypass turbine 134 via turbine bypass passage 133 as controlled by wastegate 138. The position of wastegate 138 may be controlled by an actuator (not shown) as directed by controller 12. As one non-limiting example, controller 12 can adjust the position of wastegate 138 via a solenoid valve controlling a pneumatic actuator. For example, the solenoid valve may receive a signal for facilitating the actuation of wastegate 138 via the pneumatic actuator based on the difference in air pressures between intake passage 144 arranged upstream of compressor 132 and intake passage 149 arranged downstream of compressor 132. In other examples, other suitable approaches other than a solenoid valve may be used for actuating wastegate 138.

In some examples, exhaust turbines 124 and 134 may be configured as variable geometry turbines, wherein controller 12 may adjust the position of the turbine impeller blades (or vanes) to vary the level of energy that is obtained from the exhaust gas flow and imparted to their respective compressor. Alternatively, exhaust turbines 124 and 134 may be configured as variable nozzle turbines, wherein controller 12 may adjust the position of the turbine nozzle to vary the level of energy that is obtained from the exhaust gas flow and imparted to their respective compressor. For example, the control system can be configured to independently vary the vane or nozzle position of the exhaust gas turbines 124 and 134 via respective actuators.

Products of combustion exhausted by the cylinders via exhaust passage 19 may be directed to the atmosphere via exhaust passage 180 downstream of turbine 134, while combustion products exhausted via exhaust passage 17 may be directed to the atmosphere via exhaust passage 170 downstream of turbine 124. Exhaust passages 170 and 180 may include one or more exhaust after-treatment devices, such as a catalyst, and one or more exhaust gas sensors. For example, as shown at FIG. 1, exhaust passage 170 may include an emission control device 129 arranged downstream of the turbine 124, and exhaust passage 180 may include an emission control device 127 arranged downstream of the turbine 134. Emission control devices 127 and 129 may be selective catalytic reduction (SCR) devices, three way catalysts (TWC), $NO_x$ traps, various other emission control devices, or combinations thereof. Further, in some embodiments, during operation of the engine 10, emission control devices 127 and 129 may be periodically regenerated by operating at least one cylinder of the engine within a particular air/fuel ratio, for example.

Engine system 100 may further include one or more exhaust gas recirculation (EGR) systems for recirculating at least a portion of exhaust gas from the exhaust manifold to the intake manifold. These may include one or more high-pressure EGR systems for proving high pressure EGR (HP EGR) and one or more low-pressure EGR-loops for providing low pressure EGR (LP EGR). In one example, HP EGR may be provided in the absence of boost provided by turbochargers 120, 130, while LP EGR may be provided in the presence of turbocharger boost and/or when exhaust gas temperature is above a threshold. In still other examples, both HP EGR and LP EGR may be provided simultaneously.

In the depicted example, engine system 100 may include a low-pressure (LP) EGR system 108. LP EGR system 108 routes a desired portion of exhaust gas from exhaust passage 170 to intake passage 142. In the depicted embodiment, EGR is routed in an EGR passage 197 from downstream of turbine 124 to intake passage 142 at a mixing point located upstream of compressor 122. The amount of EGR provided to intake passage 142 may be varied by the controller 12 via EGR valve 121 coupled in the LP EGR system 108. In the example embodiment shown at FIG. 1, LP EGR system 108 includes an EGR cooler 113 positioned upstream of EGR valve 121. EGR cooler 113 may reject heat from the recirculated exhaust gas to engine coolant, for example. The LP EGR system may include a differential pressure over valve (differential pressure or delta Pressure or DP) sensor 125. In one example, an EGR flow rate may be estimated based on the DPOV system which includes the DP sensor 125 that detects a pressure difference between an upstream region of the EGR valve 121 and a downstream region of EGR valve 121. EGR flow rate (e.g., LP EGR flow rate) determined by the DPOV system may be further based on an EGR temperature detected by an EGR temperature sensor 135 located downstream of EGR valve 121 and an area of EGR valve opening detected by an EGR valve lift sensor 131. In other examples, EGR flow rate may be estimated based on a differential pressure over fixed orifice system. In still further examples, EGR flow rate may be estimated based on differential pressure over switchable (e.g., discrete) orifice system. In another example, EGR flow rate may be determined based on outputs from an EGR measurement system that includes an intake oxygen sensor (herein referred to as IAO2 sensor) 168, mass air flow sensor (not shown), manifold absolute pressure (MAP) sensor 182 and manifold temperature sensor 183. In some examples, both the EGR measurement systems (that is, the DPOV system including differential pressure sensor 125 and the EGR measurement system including intake oxygen sensor 168) may be used to determine, monitor and adjust EGR flow rate.

In an alternate embodiment, the engine system may include a second LP EGR system (not shown) that routes a desired portion of exhaust gas from exhaust passage 180 to intake passage 144. In another alternate embodiment, the engine system may include both the LP EGR systems (one routing exhaust gas from exhaust passage 180 to intake passage 144, and another routing exhaust gas from exhaust passage 170 to intake passage 142) described above.

In a further embodiment while not shown in FIG. 1, the engine system 100 may also include a high pressure EGR system which may route a desired portion of exhaust gas from common exhaust passage 17, upstream of the turbine 124, to intake manifold 160, downstream of intake throttle 158.

EGR valve 121 may include a body and stem (not shown), where said stem is movable within the body of the EGR valve 121 such that the opening of the EGR valve 121 may be adjusted based on the relative position of the stem and body. The EGR valve 121 may be configured to adjust an amount and/or rate of exhaust gas diverted through the EGR passage to achieve a desired EGR dilution percentage of the intake charge entering the engine, where an intake charge with a higher EGR dilution percentage includes a higher proportion of recirculated exhaust gas to air than an intake charge with a lower EGR dilution percentage. In addition to the position of the EGR valve, it will be appreciated that AIS throttle position of the AIS throttle 115, and other actuators may also affect the EGR dilution percentage of the intake charge. As an example, AIS throttle position may increase the pressure drop over the LP EGR system, allowing more flow of LP EGR into the intake system. As a result, this may increase the EGR dilution percentage, whereas less LP EGR flow into the intake system may decrease the EGR dilution percentage (e.g., percentage EGR). Accordingly, EGR dilution of the intake charge may be controlled via control of one or more of EGR valve position and AIS throttle position among other parameters. Thus, adjusting the EGR valves 121 and/or the AIS throttle 115 may adjust and EGR flow amount (or rate) and subsequently a percentage EGR in the mass air flow (e.g., air charge entering the intake manifold).

The engine 10 may further include one or more oxygen sensors positioned in the common intake passage 149. As such, the one or more oxygen sensors may be referred to as intake oxygen sensors. In the depicted embodiment, an intake oxygen sensor 168 is positioned upstream of throttle 158 and downstream of CAC 154. However, in other embodiments, intake oxygen sensor 168 may be arranged at another location along intake passage 149, such as upstream of the CAC 154. Intake oxygen sensor (IAO2) 168 may be a variable voltage (VVs) oxygen sensor or any suitable sensor for providing an indication of the oxygen concentration and EGR concentration of the intake charge air (e.g., air flowing through the common intake passage 149). In one example, the intake oxygen sensors 168 may be an intake oxygen sensor including a heated element as the measuring element. During operation, a pumping current of the intake oxygen sensor may be indicative of an amount of oxygen in the gas flow.

A pressure sensor 172 may be positioned alongside the oxygen sensor for estimating an intake pressure at which an output of the oxygen sensor is received. Since the output of the oxygen sensor is influenced by the intake pressure, a reference oxygen sensor output may be learned at a reference intake pressure. In one example, the reference intake pressure is a throttle inlet pressure (TIP) where pressure sensor 172 is a TIP sensor. In alternate examples, the reference intake pressure is a manifold pressure (MAP) as sensed by MAP sensor 182.

Engine system 100 may include various sensors 165, in addition to those mentioned above. As shown in FIG. 1, common intake passage 149 may include a throttle inlet temperature sensor 173 for estimating a throttle air temperature (TCT). Further, while not depicted herein, each of intake passages 142 and 144 may include a mass air flow sensor or alternatively the mass air flow sensor can be located in common duct 140.

Humidity sensor 189 may be included in only one of the parallel intake passages. As shown in FIG. 1, the humidity sensor 189 is positioned in the intake passage 142 (e.g., non PCV and non-purge bank of the intake passage), upstream of the CAC 154 and an outlet of the LP EGR passage 197 into the intake passage 142 (e.g., junction between the LP EGR passage 197 and the intake passage 142 where LP EGR enters the intake passage 142). Humidity sensor 189 may be configured to estimate a relative humidity of the intake air. In one embodiment, humidity sensor 189 is a UEGO sensor configured to estimate the relative humidity of the intake air based on the output of the sensor at one or more voltages. Since purge air and PCV air can confound the results of the humidity sensor, the purge port and PCV port are positioned in a distinct intake passage from the humidity sensor.

Intake oxygen sensor 168 may be used for estimating an intake oxygen concentration and inferring an amount of EGR flow through the engine based on a change in the intake oxygen concentration upon opening of the EGR valve 121. Specifically, a change in the output of the sensor upon opening the EGR valve 121 is compared to a reference point where the sensor is operating with no EGR (the zero point). Based on the change (e.g., decrease) in oxygen amount from the time of operating with no EGR, an EGR flow currently provided to the engine can be calculated. For example, upon applying a reference voltage (Vs) to the sensor, a pumping current (Ip) is output by the sensor. The change in oxygen concentration may be proportional to the change in pumping current (delta Ip) output by the sensor in the presence of EGR relative to sensor output in the absence of EGR (the zero point). Based on a deviation of the estimated EGR flow from the expected (or target) EGR flow, further EGR control may be performed.

A zero point estimation of the intake oxygen sensor 168 may be performed during idle conditions where intake pressure fluctuations are minimal and when no PCV or purge air is ingested into the low pressure induction system. In addition, the idle adaptation may be performed periodically, such as at every first idle following an engine start, to compensate for the effect of sensor aging and part-to-part variability on the sensor output.

A zero point estimation of the intake oxygen sensor may alternatively be performed during engine non-fueling conditions, such as during a deceleration fuel shut off (DFSO). By performing the adaptation during DFSO conditions, in addition to reduced noise factors such as those achieved during idle adaptation, sensor reading variations due to EGR valve leakage can be reduced.

FIGS. 2A-2B show a flow chart of a method 200 which may be used for estimating a parameter (e.g., operating parameter) of a gas flow in an engine system (e.g., engine system 100) based on separate estimates of the gas flow parameter from outputs of two sensors positioned in different locations of the engine system. Thus, method 200 may be used to combine signals derived from measurements or computations in a flow stream separated by time and location. Specifically, combining the signal outputs from two sensors may include accounting for axial diffusion of the gas between the locations of the sensors, and the accuracy of each of the sensors. However, in the description of method 200 in FIGS. 2A-2B herein, an example application of method 200 is shown. In this example, method 200 is applied to a low-pressure EGR system for estimating EGR flow using an intake oxygen sensor (such as IAO2 168 shown in FIG. 1) and/or a DP sensor (e.g., DP sensor 125 shown in FIG. 1) of a DPOV system based on engine operating conditions. Instructions for carrying out method 200 may be stored in a memory of an engine controller such as controller 12 shown in FIG. 1. Further, method 200 may be executed by the controller. The controller may estimate the EGR mass flow rate using a DP sensor which measures the pressure differential across the EGR valve and a valve position sensor (e.g., such as EGR valve lift sensor 131), as will be explained further below with reference to FIG. 3. Further, the controller may estimate a fraction of EGR gas in the intake air from an oxygen sensor (e.g., intake oxygen sensor 168) disposed downstream of the DP sensor, as will be explained further below with reference to FIG. 4. Because there may be significant error in each of the oxygen and DP sensors' signals depending on the engine operating conditions (e.g. PCV and/or purge gasses flowing through intake system, compressor surge active, CBV valve open, etc.), the accuracies of the sensors vary under different engine operating conditions. Thus, method 200 additionally comprises determining when to use signals from each of the sensors to estimate EGR flow. Method 200 further involves determining the accuracy of the sensor signals. A final, combined EGR flow estimate may be obtained by incorporating signals from both the DP and IAO2 sensors based on the accuracy of each sensor's signals. In other words, the accuracy of a sensor's signal (e.g., sensor output) may determine the extent to which its signal affects a final EGR flow estimate.

In other embodiments, method 200 may be used to make a final estimate of a parameter of gas flow for gasses other than EGR gasses (e.g., PCV, purge, exhaust gas, etc.) based on outputs from two sensors positioned in separate locations of the engine system 100. For example, the gas flow parameter may be a fraction of PCV, purge, or exhaust gas flow in the engine. The gas flow parameter may additionally or alternatively be a temperature of the gas flow measured at two different locations in the engine system. Thus, method 200 may be used to combine signals from sensors other than an intake oxygen sensor and a DP sensor positioned over an EGR valve. However, the method 200 may still include, assessing the accuracy of two sensors used to measure the selected gas flow parameter (e.g., amount of certain gas flow in the engine) based on engine operating conditions, and making a final estimate of the gas flow by incorporating estimates of the gas flow from both sensors.

Method 200 begins at 202 and the controller (e.g. controller 12) estimates and/or measures engine operating conditions based on feedback from a plurality of sensors. Engine operating conditions may include, engine speed and load, intake mass air flow, manifold pressure, a position of the CBV, a position of a PCV valve, a position of a purge valve, etc. Method 200 may proceed to 204 and the controller may estimate a first EGR fraction from the DP sensor, and determine an accuracy and tolerance for the DP EGR fraction estimate, as will be explained in greater detail below with reference to FIG. 3. The tolerance may be a range of EGR fractions centered on the EGR fraction estimate. As one example, the accuracy may be an integer value between 0 and 3. In alternate embodiments, the accuracy value may include additional integer values (e.g., 0, 1, 2, 3, 4, etc.). In yet other embodiments, the accuracy may be an alternate numerical value (e.g., such as a fraction or non-integer value) representing a relative accuracy of the EGR fraction estimated with the DP sensor. In other words, the accuracy may be any numerical value along a continuous number line. Subsequently at 206, the controller may estimate a second EGR fraction from the oxygen sensor (e.g., intake oxygen sensor) and determine a base first accuracy of the oxygen sensor outputs. Further at 206, the controller may estimate the presence of PCV and purge gasses in the intake system, as will be described in greater detail below by the method included in FIG. 4. In other examples, the methods at 204 and 206 may be executed simultaneously by the controller. In further examples, the controller may execute the method at 206 before 204.

After obtaining signals from the DP and oxygen sensors, the controller may continue to 208, and may apply a spatial delay to the position of the oxygen sensor for all DP, PCV, and purge signals. More specifically, the controller may apply a first correction factor to the EGR fraction estimate from the DP sensor, along with the estimated DP tolerance and accuracy. The first correction factor may be applied to signals from the DP sensor to account for the time it takes EGR gasses to travel from the position of the DPOV system to the downstream oxygen sensor. Measurements taken at the same time from the oxygen sensor and the DP sensor may represent different EGR gasses since the oxygen sensor is positioned a distance downstream from the DP sensor. Thus, since it make take time for EGR gasses passing through the DPOV system to reach the downstream oxygen sensor, corresponding outputs from the oxygen sensor (e.g., outputs representing the same EGR gas content) may be delayed from the DP sensor. The correction factor may be used to align the DP signals (e.g., DP tolerance, DP accuracy, EGR fraction estimate) with the oxygen sensor signals so that the same or relatively the same EGR gasses are being measured by both sensors. Said another way, the correction factor adjusts the DP measurements to represent the EGR flow currently being measured by the oxygen sensor. The first correction factor may be the same for the DP tolerance, DP accuracy, and the EGR fraction estimate from the DP sensor since all are taken from the position of the DP sensor. Further, the first correction factor may be based on the total volumetric flow rate of gas in the intake system. The controller may compute the correction factor based on a known relationship between the total volumetric flow rate and the volume of the intake system (e.g. piping, tubing, compressor, CAC) between the DP sensor and the oxygen sensor, which may be stored in the memory of the controller. Similarly, second and third correction factors may be applied to the PCV and purge levels, respectively. The second correction factor may be computed based on a known relationship between the total volumetric flow rate in the intake system and the volume between the PCV inlet (e.g., PCV conduit 198) and the oxygen sensor. The third correction factor may be computed based on a known relationship between the total volumetric flow rate in the intake system and the volume between the purge inlet (e.g., fuel vapor purge conduit 195) and the oxygen sensor. Since the PCV inlet and purge inlet are positioned separately from one another and the DP sensor, each may be separated from the oxygen sensor by a different volume. As such, the DP signal outputs, PCV, and purge signal outputs may all have different correction factors.

After applying the correction factors to the DP, purge, and PCV signals, the controller may proceed to 210 to apply a filter to the DP tolerance and EGR fraction estimate signals from the DP sensor which represents the axial diffusion of the gas mixtures traveling from the EGR inlet tube and the oxygen sensor. As such, digital signals relating to the EGR fraction estimate and DP tolerance may be continuously processed by the controller. As one example, the filter may be a first order rolling average filter. For example, the primary filter may be a low-pass filter designed to reduce the impact of signal response frequencies above a threshold frequency on the overall signal of the DP tolerance and EGR fraction estimate. In one example, the time constant of the filter may be pre-set and stored in the memory of the controller. In another example, the time constant of the filter may change depending on engine operating conditions (e.g., whether or not a CBV valve (e.g., CBVs 152 and 155) is open or closed, total volumetric flow of gasses in the intake system, etc.

The controller may then proceed to 212 to determine whether or not the DP sensor accuracy is decreasing. If the accuracy of the DP sensor is increasing, then the controller may proceed to 216 and adjust the output of the first filter in 210 based on a first threshold. Specifically, the controller may adjust the accuracy of the DP sensor so that the adjusted accuracy may only increase when the unadjusted accuracy output prior to 216 has increased above a higher first threshold. Thus, the controller may only increase the accuracy value assigned to the DP sensor from the currently assigned value, when the accuracy increases above the first threshold. The first threshold may be closer to the next highest accuracy value from the current accuracy value than the current accuracy value to ensure that the accuracy of the DP sensor is not overestimated. In one example, at 216, the controller may adjust the output of the first filter from 210 using a comparator. Specifically, the controller may apply a comparator to the output of the filter in 210 that uses a threshold value close to the next higher integer value, such that the output of the comparator changes integer state after the filtered output from 210 is within a small, calibrateable value (fixed or percentage) of the next higher integer value. As will be explained in greater detail in FIG. 3, the accuracy of the DP sensor may be assigned an integer value from 0 to 3. The comparator in 216 applied to the filtered DP accuracy signal in 210 when it is increasing uses a threshold close to the next higher integer value to ensure that the accuracy of the DP sensor does not increase to the next integer value (state) until most of the gas in the axial diffusion volume has reached the oxygen sensor. Conversely, if the controller determines that the DP accuracy is decreasing at 212, the controller may proceed to 216 adjust the DP accuracy based on a lower second threshold. Thus, the controller may decrease the accuracy value assigned to the DP sensor from the currently assigned value, when the accuracy decrease below the second threshold. The second threshold may be closer to the current accuracy value than the closest lower accuracy value to the current accuracy value, to ensure that the accuracy of the DP sensor is not overestimated. In one example, the controller may apply a comparator to the output of the filter in 210 that uses a threshold value far from the next lower integer value, such that the output of the comparator changes integer state after the filtered output from 210 is within a large, calibrateable value (fixed or percentage) of the next lower integer value. In other words, the comparator threshold will be close to the current integer value, such that the comparator changes integer state after the filtered output from 210 is within a small, calibrateable value (fixed or percentage) of the current integer value. Thus, the accuracy value assigned to the DP sensor may be reduced upon a decrease in the accuracy signal of the sensor. Thus, in some examples, applying a comparator threshold that is far from the current integer value to the filtered DP accuracy signal in 210 only when the accuracy is increasing will delay the time at which the DP accuracy signal increases integer value until the likelihood that the axial diffusion volume has passed by the oxygen sensor, and may limit overestimations of the accuracy of the DP sensor. Conversely, applying a comparator threshold that is close to the current integer value to the filtered DP accuracy signal in 210 when the accuracy is decreasing will not delay the time at which the DP accuracy signal decreases integer value, and thus decreases value when the beginning of the axial diffusion volume has reached the oxygen sensor, and again limit overestimations of the accuracy of the DP sensor.

In another embodiment, the controller may apply a comparator with thresholds far and near to the current accuracy integer value for conditions of integer value increasing and decreasing, respectively, is to omit the filter in 210 for cases where the accuracy integer value decreases, and to use a comparator threshold far from the current accuracy integer value, thus having the output of the comparator change state to the next lowest integer value immediately upon a change to the accuracy integer value entering the comparator in 212.

Thus, once the controller has applied the spatial delay at 208, the filter in 210, and the comparator in 216, the signals for the EGR fraction estimate from the DP sensor, the DP sensor accuracy, the DP tolerance, the PCV flow, and purge flow may all be time aligned with the signals from the oxygen sensor such that all the signals may reflect the gasses currently being measured at the oxygen sensor.

The controller may then proceed from 216 or 214 to 218 to determine if the accuracy of the DP sensor is equal to 1. As will be explained in greater detail below with reference to FIG. 3, the accuracy of the DP sensor may be assigned a value of 1 when one or more of compressor surge is active and the CBV is open. If the accuracy assigned to the DP sensor is 1 after the spatial delay at 208 and potential filtering at 216, and adjustments in 216, then method 200 may continue to 222 to apply a second filter for the DP EGR fraction signal, with a lower cutoff frequency than the first filter, for a calabratable amount of time, if the controller has detected a change in state of compressor surge and/or CBV valve command. Because surge may be active and/or the CBV may be open for relatively short time scales (e.g., one second), variations in the EGR fraction signal of the DP sensor due to surge and/or CBV position may be attenuated with the second filter. Thus, the second filter for the EGR fraction signal from the DP sensor at 222 maintains a relatively stable EGR estimate even when the accuracy of the DP sensor may be low (e.g., accuracy value of 1) during a CBV opening or closing event and/or when surge is active. If the controller has not detected a change in state of compressor surge or CBV valve command at 218 (e.g., the DP accuracy is not equal to 1), the controller may proceed to 220 and not apply the second filter to the DP EGR fraction signal.

The controller may proceed from either 220 or 222 to FIG. 2B. Method 200 may then proceed to 224 in FIG. 2B from FIG. 2A and the controller may determine if positive crankcase ventilation (PCV) flow (from an engine crankcase) is increasing. As described above, increasing PCV flow may be an increase in PCV flow through the intake passage and past the intake oxygen sensor. Increases in PCV and/or purge flow (e.g., purge flow from a purge fuel canister of the engine) may decrease the accuracy of the oxygen sensor. Specifically, EGR estimates from the oxygen sensor may be overestimated because the oxygen sensor may register the additional hydrocarbons from the PCV and/or purge gasses as EGR gasses. Specifically the increase in hydrocarbons from the PCV and/or purge gasses may result in a decrease in the oxygen concentration registered by the oxygen sensor, which may in turn result in an overestimation of the EGR flow. If the controller determines at 224 that PCV is increasing, then the controller proceeds to 226 and may adjust the PCV signal based on a third threshold. Thus, the controller may increase PCV signal output of the filter in 210, when the PCV signal increases above the third threshold. The third threshold may be closer to the current value than the closest higher value to the current value, to ensure that the oxygen sensor accuracy is not overestimated. In one example, the controller may adjust the PCV signal by applying a comparator to the output of the filter in 210 that uses a threshold value far from the next higher integer value, such that the output of the comparator changes integer state after the filtered output from 210 is within a large, calibrateable value (fixed or percentage) of the next higher integer value. In other words, the comparator threshold will be close to the current integer value, such that the comparator changes integer state after the filtered output from 210 is within a small, calibrateable value (fixed or percentage) of the current integer value. Thus, the integer state assigned to the PCV on signal may be increased upon a small increase in the filtered PCV on signal of the sensor from 210. Applying a comparator threshold that is near to the current integer value to the filtered PCV on signal in 210 only when the on flag is increasing from 0 to 1 will not delay the time at which the PCV on signal increases integer value until the likelihood that the axial diffusion volume has passed by the oxygen sensor, and may limit overestimations of the accuracy of the oxygen sensor due to PCV. Conversely, applying a comparator threshold that is far from the current integer value to the filtered PCV on signal in 210 when the signal is decreasing will delay the time at which the PCV on signal decreases integer value, and thus decreases value when the end of the axial diffusion volume has reached the oxygen sensor, and again limit overestimations of the accuracy of the oxygen sensor.

In another embodiment, the controller may omit the filter in 210 (or apply it with a filter constant of zero) for cases where the PCV on integer value increases before applying the comparator. The comparator threshold may be far from the current PCV on integer value, thus having the output of the comparator change state to the next highest integer value immediately upon an increase to the PCV on integer value entering the comparator in 224.

As described in greater detail below with reference to FIG. 4, the PCV flow in the intake system may be estimated based on the manifold intake pressure and may be classified as on or off (e.g., by assigning an integer value or 0 or 1 to the PCV signal). As one example, PCV and/or purge may be determined to be on or off (e.g., flowing or not flowing to the intake passage and past the oxygen sensor) based on a position of a PCV valve and/or fuel canister purge valve. As another example, PCV and/or purge may be determined to be on or off (e.g., flowing or not flowing to the intake passage and past the oxygen sensor) based on engine boosting (e.g., whether the engine is boosted or not). Thus, by omitting the filter in 210, applying a filter with 0 time constant and using a comparator threshold far from the current PCV on integer value, or applying a filter with the "normal" time constant and using a comparator threshold near to the current PCV on integer value, any increase in PCV levels will be registered (e.g., instantaneously registered) by the controller, and the PCV signal can be adjusted to "on" (assigned a value of 1) so that the accuracy of the oxygen sensor may be reduced accordingly. As such, overestimations of the accuracy of the oxygen sensor may be reduced. Conversely, if the PCV flow is not increasing at 224, then the controller may continue to 228 and may adjust the PCV signal based on a fourth threshold. Thus, the controller may decrease the PCV signal output of the filter in 210, when the PCV signal decreases by more than the third threshold. The fourth threshold may be further from the current PCV value than the closest lower value to the current value, to ensure that the oxygen sensor accuracy is not overestimated. In one example, the controller may adjust the PCV signal by applying a comparator threshold that is far from the current integer value to the filtered PCV on signal in 210 and will delay the time at which the PCV on signal decreases integer value, and thus decreases value when the end of the axial diffusion volume has reached the oxygen sensor, and again limit overestimations of the accuracy of the oxygen sensor. The PCV signal filter and comparator may ensure that PCV hydrocarbons are no longer present in the intake system, before the PCV signal is adjusted to "off" (assigned a value of 0) and the accuracy of the oxygen sensor is subsequently adjusted (e.g., increased).

Method 200 may proceed from either 226 or 228 to 230, where the controller may determine if purge flow from a fuel canister purge system and to the intake passage upstream of the intake oxygen sensor is increasing. Similarly to 224, if the controller determines at 230 that purge is increasing, then the controller proceeds to 232 and may adjust the purge signal based on a fifth threshold. Thus, the controller may increase the purge signal output of the filter in 210, when the purge signal increases by more than the fifth threshold. The fifth threshold may be closer to the current purge value than the closest higher value to the current value, to ensure that the oxygen sensor accuracy is not overestimated. In one example, the controller may adjust the purge signal by applying a comparator to the output of the filter in 210 that uses a threshold value far from the next higher integer value, such that the output of the comparator changes integer state after the filtered purge output from 210 is within a large, calibrateable value (fixed or percentage) of the next higher integer value. In other words, the comparator threshold will be close to the current integer value, such that the comparator changes integer state after the filtered purge output from 210 is within a small, calibrateable value (fixed or percentage) of the current integer value. Thus, the integer state assigned to the purge on signal may be increased upon a small increase in the filtered purge on signal of the sensor from 210. Applying a comparator threshold that is near to the current integer value to the filtered purge on signal in 210 only when the on flag is increasing from 0 to 1 will not delay the time at which the Purge on signal increases integer value until the likelihood that the axial diffusion volume has passed by the oxygen sensor, and may limit overestimations of the accuracy of the oxygen sensor due to purge.

In another example, the controller may omit the filter in 210 (or apply it with a filter constant of zero) for cases where the purge on integer value increases. Further, the controller may use a comparator threshold far from the current purge on integer value, thus having the output of the comparator change state to the next highest integer value immediately upon an increase to the Purge on integer value entering the comparator in 224.

If the controller determines that purge is not increasing at 230, the controller may proceed to 234 and adjust the purge signal based on a sixth threshold. Thus, the controller may decrease the purge signal output of the filter in 210, when the purge signal decreases by more than the sixth threshold. The sixth threshold may be further from the current purge value than the closest lower value to the current value, to ensure that the oxygen sensor accuracy is not overestimated. In one example, the controller may adjust the purge signal by applying a comparator threshold that is far from the current integer value to the filtered purge on signal in 210 when the signal is decreasing and may delay the time at which the purge on signal decreases in integer value, and thus decreases value when the end of the axial diffusion volume has reached the oxygen sensor, and may limit overestimations of the accuracy of the oxygen sensor.

As described in greater detail below with reference to FIG. 4, the purge flow may be estimated based on the manifold intake pressure and may be classified as on or off (e.g., by assigning an integer value or 0 or 1 to the PCV signal). Thus, any increase in purge levels will be immediately be registered by the controller so that the purge signal may be adjusted to "on" (e.g., assigned an integer value of 1) and the accuracy of the oxygen sensor may be reduced accordingly. As such, overestimations of the accuracy of the oxygen sensor may be reduced. The purge signal filter and comparator may ensure that purge hydrocarbons are no longer present in the intake system, before adjusting the purge signal to "off" and subsequently adjusting the accuracy of the oxygen sensor. It is important to note that the controller may alternatively proceed through method steps 230-234 before carrying out steps 224-228. In other examples the controller may carry out both series of method steps at the same time (e.g., concurrently).

After analyzing the PCV and purge signals, the controller may proceed to 236 and calculate a final oxygen sensor accuracy (e.g., final accuracy value). The base first accuracy of the oxygen sensor from 206 may be updated based on whether or not PCV and/or purge hydrocarbons are likely present at the position of the oxygen sensor (i.e. using the PCV on and purge on integer signals). As will be discussed in greater detail below with reference to FIG. 4, the base first accuracy of the oxygen sensor may be an integer value from 0 to 2. If the base first accuracy of the oxygen sensor is 0 (representing the case where the oxygen sensor is not ready, faulted, or the idle pressure compensation has not completed), then the controller may assign a final accuracy of 0 (not ready or faulted) for the oxygen sensor. If the base first accuracy of the oxygen sensor is 1 or 2 (representing the cases where the oxygen sensor has not completed its higher pressure compensation, and where it has completed it, respectively) and purge and PCV gasses are not determined to be present at the oxygen sensor (signified by the PCV on and Purge on integer signals both being zero), then the final accuracy may increase by a value of one over the base accuracy integer value. As an example, if purge and PCV gasses are not determined to be present at the oxygen sensor and the base accuracy of the oxygen sensor is 1, then the final accuracy of the oxygen sensor would be assigned a value of 2. Thus, the final accuracy of the oxygen sensor may be assigned an integer value from 0 to 3. However, if either purge and/or PCV gasses are determined to be present at the oxygen sensor, then the base first oxygen sensor accuracy is preserved in the final oxygen sensor accuracy. As an example, if either purge and/or PCV are determined to be present at the oxygen sensor and the base first accuracy is 2, then the final accuracy assigned to the oxygen sensor may also be 2.

Thus, the controller may proceed through 224-236 to calculate a final accuracy of the oxygen sensor that accounts for the presence of purge and/or PCV hydrocarbons that may affect the accuracy of the signal output from the oxygen sensor. Similarly, from 212 to 222, the controller may calculate a final DP accuracy that may be used to adjust the EGR fraction estimate from the DP sensor depending on whether not one or more of surge is active and a CBV is open. After the controller calculates the final oxygen sensor accuracy at 236, all of the signals necessary for calculating the final EGR fraction, including the DP EGR fraction, oxygen sensor EGR fraction, DP tolerance, DP accuracy, and oxygen sensor accuracy, have been collected and time-aligned, accounting for spatial delay and axial diffusion. These signals may then be used by the controller later in method 200, to determine a final fraction of EGR gas in the intake air as will be discussed in greater detail below. It is important to note that in other examples, the controller may execute 224-236 simultaneously with 212-222. In further examples, the controller may execute 224-236 before executing 212-222.

Method 200 may proceed from 236 to 238, and the controller may estimate the fraction of EGR gasses in the intake air based on the DP estimate of EGR flow, the oxygen sensor estimate of EGR flow, the DP accuracy value and DP EGR tolerance value, and the oxygen sensor accuracy value (e.g., final accuracy value). For example, a table of arbitration rules including the DP sensor and oxygen sensor accuracy values may be stored in the memory of the controller, as discussed in greater detail below with reference to FIG. 5. The arbitration rules may include commands for determining how to use the oxygen and DP sensors' EGR fraction and DP tolerance estimates to obtain a final EGR fraction estimate. More specifically, the accuracy values assigned to the DP sensor at either 214 or 216 and to the oxygen sensor at 236 may correspond to a particular command or combination of EGR signals in the table (e.g., block diagram 500 in FIG. 5) stored in the memory of the controller, which may then be used to determine a final fraction of EGR gasses in the intake air. As one example, if the accuracy values of the DP sensor and oxygen sensor are both 2, the controller may find that the corresponding command in the look-up table dictates that the EGR fraction estimate from the oxygen sensor should be used for the final EGR flow estimate (see FIG. 5 for command corresponding to accuracy values of 2). However, the EGR flow estimate may be restricted to a value within the DP tolerance interval of the EGR fraction estimate from the DP sensor. Thus, if the EGR fraction estimate from the oxygen sensor is below the lower bound of the DP tolerance interval from the DP sensor, then the final EGR fraction estimate may be the value of the lower bound of the tolerance interval of the DP sensor. In other words, the oxygen sensor EGR fraction estimate may be clipped to the bounds of the tolerance interval of the DP sensor if the EGR fraction estimate is outside the bounds of the tolerance interval (see FIG. 5 for a greater description of the arbitration rules used to determine the final EGR fraction). As such, the final EGR fraction estimate may be a combined EGR fraction estimate that may incorporate signals from both the oxygen and DP sensor (e.g., EGR fraction from oxygen sensor, EGR fraction from DP sensor, oxygen sensor accuracy, DP sensor accuracy, and DP tolerance interval). After determining the final fraction of EGR gas in the intake air at 238, the controller may proceed to 240 to assess whether or not the rate of change in the estimated EGR fraction is greater than a threshold. In one example, the threshold rate of change of the EGR fraction may be the difference between the currently estimated EGR fraction and the most recently estimated EGR fraction (e.g., final, combined EGR fraction). In other examples, the threshold rate of change of the EGR fraction may be an amount the estimated EGR fraction fluctuates over a pre-set amount of time. If the rate of change in the EGR fraction is less than the threshold at 240, then the controller may proceed to 241 to maintain the final EGR fraction determined at 238. However, if the controller determines that the rate of change in the EGR fraction is greater than the threshold rate of change at 240, the method 200 may proceed to 242 and the controller may limit the EGR rate of change to an upper threshold. If the EGR flow remains constant, the EGR flow estimated by the controller may still change because it is subject to the accuracies of the DP and oxygen sensors. Thus, the estimated EGR flow may change depending on the accuracy state estimates of the sensors. Changes in the accuracies of either of the sensors may result in a change in the arbitration rule used to determine how the sensor signals may be incorporated into a final EGR flow estimate. As such, the rate of change in the EGR fraction may be limited to an upper threshold, so that changes in the estimated EGR fraction may reflect actual changes in the EGR flow and not changes in the arbitration rules used to compute a final EGR fraction estimate. In one example, the upper threshold may be a pre-set constant, stored in the memory of the controller. In another example, if there is a change in the accuracy of the sensors and the arbitration rule dictating how the sensor signals are used to compute the final EGR flow, the upper threshold may be the change in the EGR fraction that would have occurred if there had been no change in the arbitration rule. In a further example, the upper threshold may be the greater of either a pre-set constant or the change in the EGR fraction that would have occurred had there been no change in the arbitration rule. Method 200 may proceed from either 241 or 242 to 244 and the controller may adjust the EGR valve (e.g., EGR valve 121) based on the final EGR fraction estimate. Specifically, the controller may adjust the position of the EGR valve based on the final EGR fraction estimate and a desired EGR fraction. If the estimated EGR fraction is less than a desired EGR fraction, the controller may adjust (e.g., open) the EGR valve to allow more EGR gasses to be recirculated to the intake system. Conversely, if the estimated EGR fraction is greater than a desired EGR fraction, the controller may adjust (e.g., close) the EGR valve to allow less EGR gasses to be recirculated to the intake system. The desired EGR fraction may be based on engine operating conditions such as engine speed and engine load. The method may then return.

Turning to FIG. 3, a flow chart of a method 300 is shown for assessing the accuracy of a DP sensor (e.g., DP sensor 125) used for estimating EGR flow, under varying engine operating conditions. Instructions for carrying out method 300 may be stored in a memory of an engine controller such as controller 12 shown in FIG. 1. Further, method 200 may be executed by the controller. It is important to note that method 300 may be running continuously during engine operation. As such, the controller may continuously be updating the accuracy of the DP sensor. In some examples, the controller may also store accuracy values in the memory of the controller.

Method 300 begins at 302 and the controller (e.g. controller 12) estimates and/or measures engine operating conditions based on feedback from a plurality of sensors. Engine operating conditions may include, engine speed and load, intake mass air flow, manifold pressure, a position of the CBV, a position of a PCV valve, a position of a purge valve, engine boost, etc. The controller may continue to 304 and may estimate a first EGR flow rate through an EGR valve (e.g., EGR valve 121) and a tolerance interval of a DP sensor (e.g., DP sensor 125). Specifically, the EGR flow estimate may be based on an output of the DP sensor and the flow area of the EGR valve. The flow area of the EGR valve may be estimated based on a known cross-section of the EGR valve and an EGR valve position based on an output of an EGR valve position sensor (e.g., EGR valve lift sensor 131). Thus, signals from a DPOV system comprising the DP sensor, EGR valve, and EGR valve position sensor may be used together by the controller to determine an EGR flow rate. The tolerance interval (e.g., estimation tolerance) may be computed based on a known relationship between the tolerance interval and the change in pressure across the EGR valve and the estimated or known valve opening area. Thus, the controller may look-up a tolerance interval corresponding to pressure changes across the EGR valve output by the DP sensor. The tolerance interval may give a margin of error above and below the EGR flow estimate. Said another way, the tolerance interval gives an estimate of the EGR flow within a range of values centered on the first EGR flow estimate. Once the controller estimates the EGR flow rate using the DP sensor, method 300 may proceed to 306 and the controller may convert the EGR flow to a fraction of EGR gasses in the intake air. This may be achieved by dividing the EGR flow rate estimated at 304 by the total mixture flow rate at the compressor inlet (e.g., compressor 122). The fraction of EGR gasses in the intake air, and the DP tolerance computed in 306 and 304 respectively may then be used in 204 of method 200 in FIG. 2A. Thus, the EGR flow rate may be converted to an EGR fraction, because as previously discussed with reference to the method 200 from FIGS. 2A-2B, the EGR estimates from the DP sensor and an oxygen sensor (e.g., oxygen sensor 168) may be incorporated into a final EGR fraction estimate. Since outputs of the oxygen sensor yield a measurement of the EGR flow in units of a fraction of EGR gasses in the intake air, the EGR flow rate estimated by the DP sensor may need to be converted to common units with the oxygen sensor for direct comparison.

Method 300 may proceed to 308 and the controller may determine whether or not a DP sensor fault flag has been set. A DP sensor fault flag may include indicating when the DP sensor is not ready for use. As one example, over time and engine use, soot may accumulate on the EGR valve, and may corrupt the outputs of the DP sensor. If the controller detects soot buildup on the EGR valve outside of some bound which for which a compensation may be possible, then it may signal a DP sensor fault flag. Similarly, if the DP sensor measuring the pressure across the valve opening or the DP sensor measuring the valve opening (or possibly valve lift), the controller may also signal a DP sensor fault flag. If the controller determines that the DP sensor is faulted or inoperative, then the controller may continue to 310 and set the DP accuracy to 0. From 310, the method may return. If at 308, the controller determines that a DP sensor fault flag has not been set, then the controller may proceed to 312 to determine if one or more of compressor surge is active and a CBV valve (e.g., CBVs 152 and/or 155) is open or opening. If either the CBV is opening and/or open, or compressor surge is active (e.g., the compressor is surging), then the controller may proceed to 314 and set the DP sensor accuracy to 1. The method may then return. However, if both the CBV is closed and surge is inactive, then method 300 may proceed to 316 and the controller may determine if the change in pressure across the EGR valve (e.g., differential pressure output by the DP sensor) is greater than a higher first threshold. If the change in pressure across the EGR valve is greater than a higher first threshold, then the controller may continue to 318 and set the DP sensor accuracy to 3. The method may then return. If the change in pressure across the EGR valve as registered by the DP sensor is less than the higher first threshold, then the controller may continue to 320 and determine if the pressure change across the EGR valve is less than a lower second threshold. The first and second thresholds may be pre-set and stored in the memory of the controller, with the second threshold being less than the first threshold. If the change in pressure across the EGR valve is less than the lower second threshold, then the controller may continue to 322 and set the DP sensor accuracy to 2. The method may then return. However, if the pressure change across the EGR valve is greater than the lower second threshold, then the pressure change may be in between the first and second thresholds, and the controller may continue to 324 and determine if the most recent DP accuracy value was a 0 or a 1. If the most recently recorded DP sensor accuracy was a 0 or a 1, then the controller may continue to 322 and set the DP sensor accuracy to 2. However, if the controller determines that the previous DP accuracy was a 2 or 3 at 324, then the controller may maintain the previous accuracy value at 326. The method may then return. The accuracy values assigned to the DP sensor signals may then be used as inputs in 204 of method 200 in FIG. 2A.

Thus, method 300 may include estimating a fraction of EGR gasses in the intake air, and further estimating a DP sensor tolerance that gives an acceptable margin of error for the EGR fraction estimate. Further, method 300 may include assigning an accuracy to the DP sensor signal based on a sensor fault flag, compressor surge, a status of the CBV, and the pressure change across the EGR valve. As such, method 300 may include estimating the EGR fraction to within a range, and computing an accuracy for the EGR fraction estimate based on engine operating conditions. The accuracy value assigned to the DP sensor, the EGR fraction estimate, and the DP sensor tolerance may then be used in method 200 previously discussed with reference to FIGS. 2A-2B, to compute a final EGR fraction that incorporates both the DP sensor signals and signal outputs from an oxygen sensor (e.g., oxygen sensor 168). Specifically, the accuracy, tolerance, and EGR fraction signals from the DP sensor may be further processed through filtering and time alignment with the oxygen sensor. The processed signals may then be used to estimate a final EGR fraction based on arbitration rules as will be discussed in greater detail below with reference to FIG. 5

Turning now to FIG. 4, a flow chart of a method 400 is shown for estimating a fraction of EGR gasses in the intake air of an engine using an intake oxygen sensor (e.g., oxygen sensor 168) and assessing the accuracy of outputs of the oxygen sensor. Instructions for carrying out method 400 may be stored in a memory of an engine controller such as controller 12 shown in FIG. 1. Further, method 400 may be executed by the controller. It is important to note that method 400 may be running continuously during engine operation. As such, the controller may continuously be updating the accuracy of the oxygen sensor. In some examples, the controller may also store accuracy values in the memory of the controller.

Method 400 begins at 402 and the controller (e.g., controller 12) estimates and/or measures engine operating conditions based on feedback from a plurality of sensors. Engine operating conditions may include, engine speed and load, intake mass air flow, manifold pressure, a position of the CBV, a position of a PCV valve, a position of a purge valve, etc. After estimating and/or measuring engine operating conditions, the controller may continue to 404 and estimate the EGR flow using the oxygen sensor. The oxygen sensor may be used for estimating an intake oxygen concentration and inferring a fraction of EGR gasses in the intake air based on a change in the intake oxygen concentration upon opening of the EGR valve (e.g., EGR valve 121). Specifically, a change in the output of the sensor upon opening the EGR valve is compared to a reference point where the sensor is operating with no EGR (the zero point). Based on the change (e.g., decrease) in oxygen amount from the time of operating with no EGR, an EGR flow currently provided to the engine can be calculated. For example, upon applying a reference voltage (Vs) to the sensor, a pumping current (Ip) is output by the sensor. The change in oxygen concentration may be proportional to the change in pumping current (delta Ip) output by the sensor in the presence of EGR relative to sensor output in the absence of EGR (the zero point). The fraction of EGR gasses in the intake air estimated by using outputs from the oxygen sensor may then be used as inputs at 206 in method 200 of FIGS. 2A-2B. As such, the EGR fraction estimated at 404, may be used in the method 200 discussed above with reference to FIGS. 2A-2B, to calculate a final EGR estimate that incorporates signals from both the oxygen sensor and a DP sensor (e.g., DP sensor 125).

Method 400 may continue to 406 and the controller may determine if an oxygen sensor idle adaption routine has been completed. As one example, the idle adaption routine may include learning one or more zero point or baseline correction factors of the oxygen sensor under a known pressure. In the example of an oxygen sensor located upstream of the throttle, the correction factor may be based on a known barometric pressure achieved at the oxygen sensor for idle conditions. If the controller determines that oxygen sensor idle adaptation has not been completed (or determines that the oxygen sensor is faulted), then the controller proceeds to 408 and sets the base accuracy of the oxygen sensor to 0. However, if oxygen sensor idle adaptation has been completed, then method 400 proceeds to 410 and determines if the oxygen sensor pressure adaptation has been completed. The pressure adaptation may include correcting the outputs of the oxygen sensor based on the readings at elevated intake pressures at the position of the oxygen sensor, up to the maximum expected operating pressures of the oxygen sensor in the application. Oxygen sensors may have a pressure dependency which may impact the diffusion properties of the sensing element, thereby resulting in a gain error in the sensor's output pumping current (Ip). This may be a significant noise factor for variable voltage (VVs) measurements. To correct for such errors, the output of the oxygen sensor may be corrected based on a current measured pressure, a dry air correction factor, and a pressure dependence factor based on the water vapor environment around the exhaust oxygen sensor. If the pressure adaption has not been completed, the controller may set the base accuracy of the oxygen sensor to 1 at 412. However, if the pressure adaptation has been completed, the controller may set the base accuracy of the oxygen sensor to 2 at 414.

Thus, the method 400 from 406 to 414 may include assigning a base accuracy value to the oxygen sensor based on whether an oxygen sensor fault is detected, and whether an idle adaptation routine and pressure adaptation routine have been completed. However, purge flow and/or PCV flow hydrocarbons may also affect the reading of the oxygen sensor. Specifically, the oxygen sensor may overestimate the EGR flow when purge and/or PCV hydrocarbons are flowing through the intake system, because the oxygen sensor may register the hydrocarbons from the purge and/or PCV gasses as hydrocarbons from EGR gasses. Thus, method 400 from 416 to 426 may include determining if purge and/or PCV gasses are flowing in the intake system and potentially affecting the output of the oxygen sensor. However, since the purge and PCV inlets (e.g., fuel vapor purge conduit 195 and PCV conduit 198) are positioned a distance upstream from the oxygen sensor, the PCV and purge signals received by the controller in method 400 may be time delayed and filtered before being incorporated into a final oxygen sensor accuracy. Specifically, as discussed above with reference to method 200 in FIGS. 2A-2B, the PCV and purge signals may be adjusted to account for the time it takes intake gas to travel from the PCV and purge inlets to the oxygen sensor.

Returning to method 400, the controller may continue from 414 to 416 and determine if purge is active and hydrocarbons are flowing from the purge inlet through the intake system of the engine. Purge may be active if the manifold air pressure if greater than a first threshold. The threshold may be pre-set and may be stored in the memory of the controller. For example, the threshold may be barometric pressure (e.g., ambient pressure). If the manifold air pressure is at or below the first threshold (e.g., the engine is not boosted) and purge is not active, then the controller may proceed to 418 and set a purge flag to 0, indicating that purge hydrocarbons are not flowing through the purge port. If the controller determines that purge is active then the controller may proceed to 420 and set the purge flag to 1 indicating that purge is active. Method 400 may continue from either 418 or 420 to 422 and the controller may determine if PCV is active and PCV hydrocarbons are flowing through the PCV port. The controller may determine that PCV is active if the manifold air pressure is greater than barometric pressure, thereby indicating that the engine is boosted. If the controller determines that manifold air pressure not above barometric pressure and PCV is not active at 422, then method 400 may continue to 424 and the controller may set a PCV flag to 0 indicating that PCV is not active. However, if at 422 the controller determines that the manifold air pressure is above barometric pressure, then the controller may set a PCV flag to 1 indicating that PCV is active. Thus, method 400 may include determining whether or not purge and PCV gasses are flowing through the intake system. The flow of purge and PCV gasses in the intake system may then be stored in the memory of the controller and used in method 200 to make a final estimate of the oxygen sensor accuracy as discussed in greater detail above with reference to FIGS. 2A-2B. It should also be noted that in one example method steps 422-426 may occur simultaneously with steps 416-420. In another example, steps 422-426 may occur before steps 416-420. Further the controller may compute the base accuracy of the oxygen sensor (404-414) at the same time as estimating purge and/or PCV flows (416-426). In a further example, controller may estimate purge and/or PCV flows (416-426) before computing the base accuracy of the oxygen sensor (404-414).

Referring now to FIG. 5, a block diagram 500 shows a table for determining how to estimate a fraction of EGR gasses in the intake air using a DP sensor (e.g., DP sensor 125) and an oxygen sensor (e.g., oxygen sensor 168). As one example, block diagram 500 may be used by a controller (e.g., controller 12) in the method 200 discussed above with reference to FIGS. 2A-2B. More specifically, block diagram 500 may include the arbitration rules used at step 238 in method 200 as discussed above in greater detail above with reference to FIGS. 2A-2B. However, it is important to note that the arbitration rules included in block diagram 500 are only example arbitration rules that may be used in the method 200. In other embodiments, additional or alternative arbitration rules may be used by the controller to make a final EGR fraction estimate that incorporates outputs from both the oxygen and DP sensors and is based on accuracy values of the two different sensor measurements. Thus, block diagram 500 may be used by the controller to determine the final estimate of the fraction of EGR gasses in the intake air based on the accuracies of the oxygen and DP sensors, the EGR fractions estimated using both of the sensor signals, and the tolerance of the DP sensor. It is important to note that since block diagram 500 is used in step 238 in method 200, the signals for the EGR fraction estimate from the DP sensor, the DP sensor accuracy, and DP tolerance may already be time aligned with the oxygen sensor and properly filtered prior to using the arbitration rules in block diagram 500 to determine a final EGR fraction estimate. For example, if the DP accuracy is 1, (e.g., compressor surge is active and/or a CBV valve is open) the signal of the EGR fraction from the DP sensor may already have been filtered through the second filter (with a lower cutoff frequency) at 222 from method 200. More specifically, cutoff frequency, and thus frequency of signals allowed to pass through the filter may be decreased in the second filter from the first filter applied to the EGR fraction signal when the DP sensor accuracy is greater than 1. For DP accuracies of 2 and 3, purge may be inactive, and a CBV may be closed. Additionally, the final oxygen sensor accuracy has been computed based on the time aligned and filter PCV and purge signals. Thus, at step 238 in method 200 the final accuracy values may be known for both the DP sensor and the oxygen sensor. As such the controller may look up the rule in block diagram 500 corresponding to the accuracy values for the oxygen and DP sensors, and determine the final EGR fraction based on the arbitration rule described in the block diagram 500.

As discussed in greater detail above with reference to FIGS. 2A-2B, purge and/or PCV hydrocarbons may be present in the intake system (at the oxygen sensor location) at oxygen accuracy values of 1 or 2. At oxygen accuracy of 0, the oxygen sensor may be faulted due to the idle adaptation not being completed as discussed in greater detail with reference to FIG. 4. At an oxygen accuracy of 3, PCV and/or purge hydrocarbons may not be present in the intake system at the oxygen sensor location as discussed in greater detail with reference to FIGS. 2 and 4.

The oxygen sensor accuracies are sorted along the columns, in the first row of block diagram 500 in decreasing accuracy from left to right. The DP accuracies are sorted along the rows, in the first column of block diagram 500 in decreasing accuracy from top to bottom. The accuracy values (e.g., 0 to 3) for the DP and oxygen sensors in block diagram 500 may correspond to the accuracy values for the DP and oxygen sensors computed in method 200 discussed above with reference to FIGS. 2A-2B.

Turning now to the rules included in block diagram 500 for computing a final fraction of EGR gasses in the intake air, if the accuracy of either DP sensor, or the oxygen sensor is 0, as shown at 505, 509, and 513-517, then the controller may not make (e.g., determine) an EGR estimate If the oxygen sensor accuracy is 1 and the DP sensor accuracy is 3, as shown at 510, then the controller may use the EGR fraction estimate from the DP sensor exclusively for the final EGR fraction estimate. In other words the final EGR estimate may be the same as the EGR fraction estimate from the DP sensor If the oxygen sensor accuracy is 1, and the DP sensor accuracy is 1 or 2, as shown at 511 and 512, or if the oxygen sensor accuracy is 2 and the DP sensor accuracy is greater than 0, as shown at 506-508, the controller may restrict the oxygen sensor EGR fraction estimate to within the bounds of the DP sensor tolerance interval. Thus the final EGR fraction estimate may be the same as the oxygen sensor EGR fraction estimate determined from the oxygen sensor if the oxygen sensor EGR fraction estimate if within the tolerance interval of the DP sensor. However, if the EGR fraction estimate from the oxygen sensor is outside the tolerance interval of the DP sensor, then the final EGR fraction estimated by the controller may be the same as the upper or lower bound of the DP tolerance, whichever is closer to the oxygen sensor EGR fraction.

If the oxygen sensor accuracy is at an upper threshold (e.g., 3), and the DP sensor accuracy is greater than 0, as shown at 502-504, and water vapor/droplets on the oxygen sensor are determined to not be present, then the controller may use the oxygen sensor EGR fraction estimate for the final estimate of the fraction of EGR gasses in the intake air. The oxygen sensor accuracy upper threshold may be a maximum attainable accuracy for the oxygen sensor. The controller may determine that the upper accuracy threshold has been achieved when the PCV and purge gasses are not flowing past the oxygen sensor, the sensor is not faulted and has completed an idle adaptation routine, and water vapor/droplets are not present on the oxygen sensor. Thus, the final EGR fraction estimate may be the same as the oxygen sensor EGR fraction estimate. In another example, if water droplets and/or vapors may be present at the position of the oxygen sensor (due, possibly, to condensate being expelled from a CAC upstream of the oxygen sensor), then the controller may restrict the oxygen sensor EGR estimate to within the bound of the DP sensor tolerance interval as discussed earlier. The controller may determine that water droplets and/or vapor may be present at the position of the oxygen sensor if condensate is being expelled from a charge air cooler positioned upstream of the oxygen sensor.

In other embodiments, the accuracy values assigned to the DP and oxygen sensor may be different integer values than the ones described in block diagram 500 (e.g., 0, 1, 2, and 3). As such, the arbitration rules may be assigned to different corresponding DP and oxygen sensor accuracy values than the ones described in block diagram 500. In yet further embodiments, other arbitration rules may exist besides the ones mentioned in block diagram 500. As an example, the final EGR fraction estimate may be a weighted mean of the DP and oxygen sensor EGR fraction estimates that is based on the accuracy of the DP and oxygen sensors. As such, the final EGR fraction estimate may be weighted more heavily towards the more accurate sensor EGR fraction estimate. For example, if the accuracy value of the DP sensor is higher than the oxygen sensor, the final EGR fraction estimate may more closely resemble the EGR fraction estimate from the DP sensor than the oxygen sensor.

Thus, block diagram 500 may include conditions (e.g., rules) for determining how to use signal outputs from an oxygen and DP sensor to compute a fraction of EGR gasses in the intake air depending on the accuracy of the sensors under varying engine operating conditions. More specifically, the controller may use either the DP sensor EGR fraction estimate, the oxygen sensor EGR fraction estimate, or the oxygen sensor EGR fraction estimate restricted to within the DP tolerance interval to make a final estimate of the fraction of EGR gasses in the intake air.

In this way, a method for an engine may comprise adjusting engine operation based on a final gas flow parameter estimate, the final gas flow parameter estimate based on each of a first gas flow parameter estimated with a first sensor, a second gas flow parameter estimated with a second sensor positioned away from the first sensor in a gas passage of the engine, and accuracy values of each of the first and second gas flow parameters. The final gas flow parameter estimate is a final exhaust gas recirculation (EGR) flow estimate and wherein adjusting engine operation includes adjusting an EGR valve based on the final EGR flow estimate, the final EGR flow estimate based on each of a first EGR flow estimated with a differential pressure sensor across the EGR valve, a second EGR flow estimated with an intake oxygen sensor, and accuracy values of each of the first and second EGR flows. The accuracy values may be based on engine operating conditions during estimation of the first EGR flow and the second EGR flow and wherein the accuracy values are integer values between zero and three. The method may further include: assigning a first accuracy value to the first EGR flow based on each of compressor surge, a position of a compressor bypass valve, and a differential pressure output by the differential pressure sensor. The method may further include: assigning a second base accuracy value to the second EGR flow based on whether an idle adaption and pressure adaption routine for correcting an output of the intake oxygen sensor has been performed. The method may further comprise modifying the second base accuracy value to determine a final second accuracy value of the second EGR flow based on purge and positive crankcase ventilation (PCV) flow past the intake oxygen sensor. The method may further include adjusting the first EGR flow and a first accuracy value of the first EGR flow by a time delay before determining the final EGR flow estimate, the time delay based on a spatial delay accounting for a volume between the differential pressure sensor and the intake oxygen sensor. The final EGR flow estimate may further be based on an estimation tolerance of estimating the first EGR flow with the differential pressure sensor, the estimation tolerance based on one or more of a differential pressure measured with the differential pressure sensor and a valve lift of the EGR valve. The method may further comprise determining the final EGR flow estimate based on the second EGR flow bounded by the first EGR flow and the estimation tolerance when one of a second accuracy value of the second EGR flow is a first value, the secondary accuracy value is a second value, the second value greater than the first value, and water droplets on the intake oxygen sensor are possible, or when the second accuracy value is a third value, the third value lower than the first value, and a first accuracy value of the first EGR flow is less than the second value. The method may further include determining the final EGR flow estimate based on the second EGR flow and not the first EGR flow when a second accuracy value of the second EGR flow is at an upper threshold value and water droplets on the intake oxygen sensor are not expected. The method may further include determining the final EGR flow estimate based on one of the first EGR flow or the second EGR flow bounded by the first EGR flow when a first accuracy value of the first EGR flow is at an upper threshold value and a second accuracy value of the second EGR flow is a second value, the second value less than the upper threshold.

In this way, a method may comprise: estimating a first exhaust gas recirculation (EGR) flow with a differential pressure sensor across an EGR valve and a second EGR flow with an intake oxygen sensor, assigning a first accuracy value to the first EGR flow and a second accuracy value to the second EGR flow based on engine operating conditions and sensor conditions, and adjusting the EGR valve based on a final EGR flow estimate, the final EGR flow estimate based on the first EGR flow, the second EGR flow, the first accuracy value, and the second accuracy value. The first accuracy value may decrease when a differential pressure measured by the differential pressure sensor is less than a threshold, during a compressor surge event, when a compressor bypass valve is opening, and when a flag is set indicating a fault of the differential pressure sensor. The second accuracy value may decrease when adaption routines to correct an output of the intake oxygen sensor have not been run, as purge flow to the intake oxygen sensor increases, and as positive crankcase ventilation (PCV) flow to the intake oxygen sensor increases. The method may further comprise determining a tolerance interval of the first EGR flow, the tolerance interval based on a differential pressure measured by the differential pressure sensor and a valve lift of the EGR valve. The method may further comprise combining the first EGR flow and the second EGR flow into the final EGR flow estimate, where the combining is based on the first accuracy value, the second accuracy value, and the estimation tolerance. The method may further include when one or more of the second accuracy value is less than a first value and the second accuracy value is the first value while water droplets on the intake oxygen sensor are possible, restricting the second EGR flow to be within the tolerance interval of the first EGR flow and determining the final EGR flow estimate based on the restricted second EGR flow. The method may further comprise when the second accuracy value is a first value and water droplets on the intake oxygen sensor are not possible, determining the final EGR flow estimate to be the second EGR flow and not the first EGR flow.

In this way a system may comprise a turbocharger with an intake compressor and an exhaust turbine, a low-pressure exhaust gas recirculation (EGR) passage coupled between an exhaust passage downstream of the exhaust turbine and the intake passage upstream of the intake compressor, the low-pressure EGR passage including an EGR valve and differential pressure (DP) sensor for measuring EGR flow, an intake oxygen sensor disposed in an intake of the engine downstream from the low-pressure EGR passage, and a controller with computer-readable instructions for determining a final EGR flow estimate based on a first EGR flow estimate based on an output of the DP sensor, a second EGR flow estimate based on an output of the intake oxygen sensor, a first accuracy value of the first EGR flow estimate and a second accuracy value of the second EGR flow estimate. The first accuracy value may be an integer value based on one or more of compressor surge, a position of a compressor bypass valve, and a differential pressure output by the differential pressure sensor. The second accuracy value may be an integer value base on one or more of whether a sensor fault exists, an idle adaption and pressure adaption routine for correcting an output of the intake oxygen sensor has been performed, an amount of purge flow past the intake oxygen sensor, and an amount of PCV flow past the intake oxygen sensor.

In this way, a method may include estimating a fraction of EGR gasses in the intake system of an engine based on outputs from both an intake oxygen sensor, and a DPOV system comprising a delta pressure (DP) sensor. Both the DP sensor and the oxygen sensor may be used to give separate estimates of the EGR fraction in the intake air of the intake system. Depending on the engine operating conditions, the accuracy of the outputs from each of the sensors may be assessed. The accuracy of the oxygen sensor's outputs may be based on whether the oxygen sensor has completed one or more idle adaptation or pressure adaptation routines, and whether or not purge and/or PCV gasses are flowing past the oxygen sensor. The accuracy of the DP sensor may be determined based on whether surge is active, a CBV is open or opening, and a pressure difference across an EGR valve. Outputs signals reflecting the purge and PCV flows as well as signals from the DP sensor may be time aligned to the position of the oxygen sensor to account for the time it takes gasses to travel from the PCV port, purge port, and DPOV system to oxygen sensor positioned downstream therefrom. These output signals may be filtered to represent axial diffusion, and modified by a comparator using calibrateable thresholds to obtain final integer state values, as may be required by the arbitration rules, and to reduce overestimation of the sensor's accuracies.

Depending on the accuracy the oxygen and DP sensors, the fraction of EGR gasses in the intake air may be estimated differently. The oxygen and DP sensors may each be assigned an accuracy value from 0 to 3. If the accuracy of either DP sensor, or the oxygen sensor is 0, then the controller may not make an EGR estimate. If the oxygen sensor accuracy is 1 and the DP sensor accuracy is 3, then the controller may use the EGR fraction estimate from the DP sensor exclusively for the final EGR fraction estimate. If the oxygen sensor accuracy is 1, and the DP sensor accuracy is 1 or 2, or if the oxygen sensor accuracy is 2 and the DP sensor accuracy is greater than 0, the controller may restrict the oxygen sensor EGR fraction estimate to within the bounds of the DP sensor tolerance interval. If the oxygen sensor accuracy is 3 and the DP sensor accuracy is greater than 0 then the controller may use the oxygen sensor EGR fraction estimate for the final estimate of the fraction of EGR gasses in the intake air. Thus, under certain engine operating conditions, the oxygen sensor may be used exclusively to estimate the EGR fraction. At other engine operating conditions the DP sensor may be used exclusively to estimate the EGR fraction. Under still further engine operating conditions signal outputs from the oxygen sensor and the DP sensor may be incorporated along with a DP sensor tolerance in the a final EGR fraction estimate.

In this way, a technical effect of determining a more accurate EGR flow estimate based on the outputs and accuracies of both an oxygen sensor and a delta pressure sensor is achieved. As a result, EGR flow control via an EGR valve may be more accurate. By determining the accuracy of the outputs of both of the sensors based on engine operating conditions, a more accurate estimate of the EGR flow may be obtained by using outputs from the more accurate sensor for the estimate of the EGR flow. Additionally, under some conditions when the accuracies of the sensors may be the same or similar, a combination of the two sensor outputs may be incorporated to provide a more accurate estimate of the EGR flow in the intake system. Thus, not only may the overall accuracy of the EGR flow be increased, but the accuracy of the EGR flow estimate may be maintained under a wider range of engine operating conditions as well.

In another representation a method comprises: estimating a first exhaust gas recirculation (EGR) flow with a differential pressure sensor across an EGR valve and a second EGR flow with an intake oxygen sensor, during a first condition, adjusting EGR based on the first EGR flow estimate and not the second EGR flow estimate, during a second condition, adjusting EGR based on the second EGR flow estimate and not the first EGR flow estimate, and during a third condition, combining the first EGR flow estimate and the second EGR flow estimate into a single, combined EGR estimate and adjusting EGR based on the combined EGR estimate.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for an engine, comprising:
adjusting engine operation based on a final gas flow parameter estimate, the final gas flow parameter estimate based on each of a first gas flow parameter estimated with a first sensor, a second gas flow parameter estimated with a second sensor positioned away from the first sensor in a gas passage of the engine, and accuracy values of each of the first and second gas flow parameters, wherein the final gas flow parameter estimate is a final exhaust gas recirculation (EGR) flow estimate and wherein adjusting engine operation includes adjusting an EGR valve based on the final EGR flow estimate, the final EGR flow estimate based on each of a first EGR flow estimated with a differential pressure sensor across the EGR valve, a second EGR flow estimated with an intake oxygen sensor, and accuracy values of each of the first and second EGR flows.

2. The method of claim 1, wherein the final EGR flow estimate is further based on an estimation tolerance of estimating the first EGR flow with the differential pressure sensor, the estimation tolerance based on one or more of a differential pressure measured with the differential pressure sensor and a valve lift of the EGR valve.

3. The method of claim 1, wherein the accuracy values are based on engine operating conditions during estimation of the first EGR flow and the second EGR flow and wherein the accuracy values are integer values between zero and three.

4. The method of claim 1, further comprising assigning a first accuracy value to the first EGR flow based on each of compressor surge, a position of a compressor bypass valve, and a differential pressure output by the differential pressure sensor.

5. The method of claim 1, further comprising assigning a second base accuracy value to the second EGR flow based on whether an idle adaption and pressure adaption routine for correcting an output of the intake oxygen sensor has been performed.

6. The method of claim 5, further comprising modifying the second base accuracy value to determine a final second accuracy value of the second EGR flow based on purge and positive crankcase ventilation (PCV) flow past the intake oxygen sensor.

7. The method of claim 1, further comprising adjusting the first EGR flow and a first accuracy value of the first EGR flow by a time delay before determining the final EGR flow estimate, the time delay based on a spatial delay accounting for a flow rate and volume between the differential pressure sensor and the intake oxygen sensor.

8. The method of claim 2, further comprising determining the final EGR flow estimate based on the second EGR flow bounded by the first EGR flow and the estimation tolerance when one of a second accuracy value of the second EGR flow is a first value, the secondary accuracy value is a second value, the second value greater than the first value, and water droplets on the intake oxygen sensor are possible, or when the second accuracy value is a third value, the third value lower than the first value, and a first accuracy value of the first EGR flow is less than the second value.

9. The method of claim 1, further comprising determining the final EGR flow estimate based on the second EGR flow and not the first EGR flow when a second accuracy value of the second EGR flow is at an upper threshold value and water droplets on the intake oxygen sensor are not expected.

10. The method of claim 1, further comprising determining the final EGR flow estimate based on one of the first EGR flow or the second EGR flow bounded by the first EGR flow when a first accuracy value of the first EGR flow is at an upper threshold value and a second accuracy value of the second EGR flow is a second value, the second value less than the upper threshold value.

11. A method, comprising:
estimating a first exhaust gas recirculation (EGR) flow with a differential pressure sensor across an EGR valve and a second EGR flow with an intake oxygen sensor;
assigning a first accuracy value to the first EGR flow and a second accuracy value to the second EGR flow based on engine operating conditions and sensor conditions; and
adjusting the EGR valve based on a final EGR flow estimate, the final EGR flow estimate based on the first EGR flow, the second EGR flow, the first accuracy value, and the second accuracy value.

12. The method of claim 11, wherein the first accuracy value decreases when a differential pressure measured by the differential pressure sensor is less than a threshold, during a compressor surge event, when a compressor bypass valve is opening, and when a flag is set indicating a fault of the differential pressure sensor.

13. The method of claim 11, wherein the second accuracy value decreases when adaption routines to correct an output of the intake oxygen sensor have not been run, as purge flow to the intake oxygen sensor increases, and as positive crankcase ventilation (PCV) flow to the intake oxygen sensor increases.

14. The method of claim 11, further comprising determining a tolerance interval of the first EGR flow, the tolerance interval based on a differential pressure measured by the differential pressure sensor and a valve lift of the EGR valve.

15. The method of claim 14, further comprising combining the first EGR flow and the second EGR flow into the final EGR flow estimate, where the combining is based on the first accuracy value, the second accuracy value, and an estimation tolerance.

16. The method of claim 11, further comprising when one or more of the second accuracy value is less than a first value and the second accuracy value is the first value while water droplets on the intake oxygen sensor are possible, restricting the second EGR flow to be within the tolerance interval of the first EGR flow and determining the final EGR flow estimate based on the restricted second EGR flow and further comprising when the second accuracy value is the first value and water droplets on the intake oxygen sensor are not possible, determining the final EGR flow estimate to be the second EGR flow and not the first EGR flow.

17. A system, comprising:
a turbocharger with an intake compressor and an exhaust turbine;
a low-pressure exhaust gas recirculation (EGR) passage coupled between an exhaust passage downstream of the exhaust turbine and an intake passage upstream of the intake compressor, the low-pressure EGR passage including an EGR valve and a differential pressure (DP) sensor for measuring EGR flow;
an intake oxygen sensor disposed in an intake of an engine downstream from the low-pressure EGR passage; and
a controller with computer-readable instructions for:
determining a final EGR flow estimate based on a first EGR flow estimate based on an output of the DP sensor, a second EGR flow estimate based on an output of the intake oxygen sensor, a first accuracy value of the first EGR flow estimate, and a second accuracy value of the second EGR flow estimate.

18. The system of claim 17, wherein the first accuracy value is an integer value based on one or more of compressor surge, a position of a compressor bypass valve, and a differential pressure output by the DP sensor.

19. The system of claim 17, wherein the second accuracy value is an integer value base on one or more of whether an idle adaption and pressure adaption routine for correcting an output of the intake oxygen sensor has been performed, an amount of purge flow past the intake oxygen sensor, and an amount of PCV flow past the intake oxygen sensor.

* * * * *